United States Patent
Nakamura et al.

(10) Patent No.: US 7,370,576 B2
(45) Date of Patent: *May 13, 2008

(54) STENCIL PRINTING METHOD FOR PRINTING WATER-BASED INK

(75) Inventors: Akira Nakamura, Ibaraki-ken (JP); Taku Naitou, Ibaraki-ken (JP); Takuya Shibahara, Ibaraki-ken (JP); Yoshihiro Hayashi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 11/083,318

(22) Filed: Mar. 18, 2005

(65) Prior Publication Data

US 2005/0211115 A1   Sep. 29, 2005

(30) Foreign Application Priority Data

Mar. 23, 2004   (JP) .......................... P2004-084576

(51) Int. Cl.
*B41M 1/12*   (2006.01)
*B41L 13/18*   (2006.01)

(52) U.S. Cl. ...................... 101/119; 101/116; 101/129; 101/491

(58) Field of Classification Search ........ 101/116–120, 101/129, 491
See application file for complete search history.

(56) References Cited

U.S. PATENT DOCUMENTS 4,585,815 A   4/1986   Ono et al.
5,462,768 A * 10/1995   Adkins et al. .............. 427/265
6,090,193 A   7/2000   Nigam et al.
2002/0014168 A1   2/2002   Iimura
2002/0062747 A1   5/2002   Hashimoto et al.
2004/0069164 A1* 4/2004   Nakamura et al. .......... 101/119

FOREIGN PATENT DOCUMENTS

| EP | 1 000 766 A1 | 5/2000 |
| EP | 1 129 858 A1 | 9/2001 |
| GB | 752336 | 7/1956 |
| JP | 07-132675 | 5/1995 |
| JP | 07-166121 | 6/1995 |
| JP | 07-196966 | 8/1995 |
| JP | 11-106695 | 4/1999 |
| JP | 2001-246828 | 9/2001 |
| JP | 2001-302955 | 10/2001 |
| JP | 2002-030238 | 1/2002 |
| KR | 0168227 | 1/1997 |

* cited by examiner

*Primary Examiner*—Leslie J. Evanisko
(74) *Attorney, Agent, or Firm*—The Nath Law Group; Jerald L. Meyer; Derek Richmond

(57) ABSTRACT

A stencil printing method employs a stencil printing machine comprising: a drum which is rotatable and has a outer peripheral wall formed by an ink impermeable member and in which a stencil sheet is mounted on a surface of the outer peripheral wall; an ink supply device which has an ink supply unit provided on the outer peripheral wall of the drum and supplies ink on the surface of the outer peripheral wall from the ink supply unit; and a pressure roller which presses a fed print medium onto the outer peripheral wall; the method comprising: a step of mounting a stencil sheet on the drum; a step of plate-making the stencil sheet; and a step of transferring a water-based ink to a print medium by making the water-based ink pass through perforations of the stencil sheet.

4 Claims, 22 Drawing Sheets

STENCIL PRINTING METHOD FOR PRINTING WATER-BASED INK

BACKGROUND OF THE INVENTION

1. Field of the Invention

The present invention relates to a stencil printing method using a stencil printing machine which conveys a print medium while pressing the print medium to a drum on which a stencil sheet is mounted, and transfers ink oozing from perforations of the stencil sheet onto the print medium; and a water-based ink for stencil printing that is suitable for use in this stencil printing machine.

2. Description of Related Art

The stencil printing process, unlike printing processes such as offset printing, gravure printing, and relief printing, has ease of operation and simplicity since there is no necessity for complicated operations such as washing after use and no necessity for a specialist operator. In accordance with the use of a heat sensitive plate-making method employing a thermal head as a device, in the stencil printing process, image processing is digitized, high quality printed material can be obtained simply in a short period of time, and its convenience as an information processing terminal is therefore widely acknowledged.

Printing method of a conventional stencil printing machine include an inner press printing method (refer to Japanese Patent Laid-Open Publication No. 7-132675) and an outer press printing method (refer to Japanese Patent Laid-Open Publication No. 2001-246828).

As the stencil printing ink, a water-in-oil (W/O) type emulsion ink has been generally used conventionally. W/O type emulsion inks have the function of suppressing changes in ink composition and physical properties even if the ink within the printing machine is in contact with the atmosphere when the printing machine is allowed to stand in a nonoperating state. Because of this, whereas the W/O type emulsion ink has the advantage that it has excellent storage stability, it has the problem that drying properties after printing on a print medium (substrate) such as a paper are poor.

Various improvements have been carried out in order to improve the drying properties on printed materials. For example, an ultraviolet curing type ink for stencil printing that is dried and fixed by irradiation with ultraviolet rays (Japanese Patent Laid-Open Publication No. 2002-30238) is known. Furthermore, a stencil printing method in which penetration of a water-based ink into paper is enhanced by adding a base to a printed surface immediately after printing (Japanese Patent Laid-Open Publication No. 2001-302955) is known.

However, when a drying method involving a chemical reaction is used, it is necessary to employ irradiation equipment for the curing energy, coating equipment for a reaction solution, energy therefor, etc., and it is also necessary for the ink to contain expensive starting materials.

On the other hand, in the case of a water-based ink, when the ink within a printing machine is allowed to stand for a long period of time in an open system with the printing machine in a nonoperating state, there are the problems that the water contained in the ink easily evaporates, the flowability of the ink is lost, and the composition and the physical properties of the ink change. As a result, the printing operability after the printing machine is allowed to stand for a long period of time in a nonoperating state is degraded, and printing operations cannot be carried out again without disassembling and washing the printing machine immediately after printing or immediately before resuming printing, high quality images cannot be obtained with ink that has deteriorated, and there has therefore been a desire for an improvement of these points.

It is therefore an object of the present invention to provide a stencil printing method and a water-based ink for stencil printing that can eliminate the necessity for operations such as washing even when a printing machine is allowed to stand for a long period of time in a nonoperating state, enable the same printing performance as that prior to being left standing to be obtained even after the printing machine has been allowed to stand for a long period of time, and gives printed material having excellent drying properties and excellent image properties without employing special means, equipment, energy, etc. such as applying heat, light, or a reactive material.

SUMMARY OF THE INVENTION

A first aspect of the present invention relates to a stencil printing method carried out by employing a stencil printing machine comprising:

a drum which is rotatable and has a outer peripheral wall formed by an ink impermeable member and in which a stencil sheet is mounted on a surface of the outer peripheral wall;

an ink supply device which has an ink supply unit provided on the outer peripheral wall of the drum and supplies ink on the surface of the outer peripheral wall from the ink supply unit; and a pressure roller which presses a fed print medium onto the outer peripheral wall;

the method comprising:

a step of mounting a stencil sheet on the drum;

a step of plate-making the stencil sheet; and a step of transferring a water-based ink to a print medium by making the water-based ink pass through perforations of the stencil sheet.

A second aspect of the present invention relates to a water-based ink for stencil printing for use in a stencil printing machine comprising:

a drum which is rotatable and has a outer peripheral wall formed by an ink impermeable member and in which a stencil sheet is mounted on a surface of the outer peripheral wall;

an ink supply device which has an ink supply unit provided on the outer peripheral wall of the drum and supplies ink on the surface of the outer peripheral wall from the ink supply unit; and a pressure roller which presses a fed print medium onto the outer peripheral wall.

BRIEF DESCRIPTION OF THE DRAWINGS

FIG. 17A is a cross-sectional view of the vicinity of the ink leakage preventing groove; FIG. 17B is a plan view partially showing the vicinity of the ink leakage preventing groove; and FIG. 17C is a cross-sectional view explaining behavior of a stencil sheet.

DETAILED DESCRIPTION OF THE PREFERRED EMBODIMENTS

Figure 1:
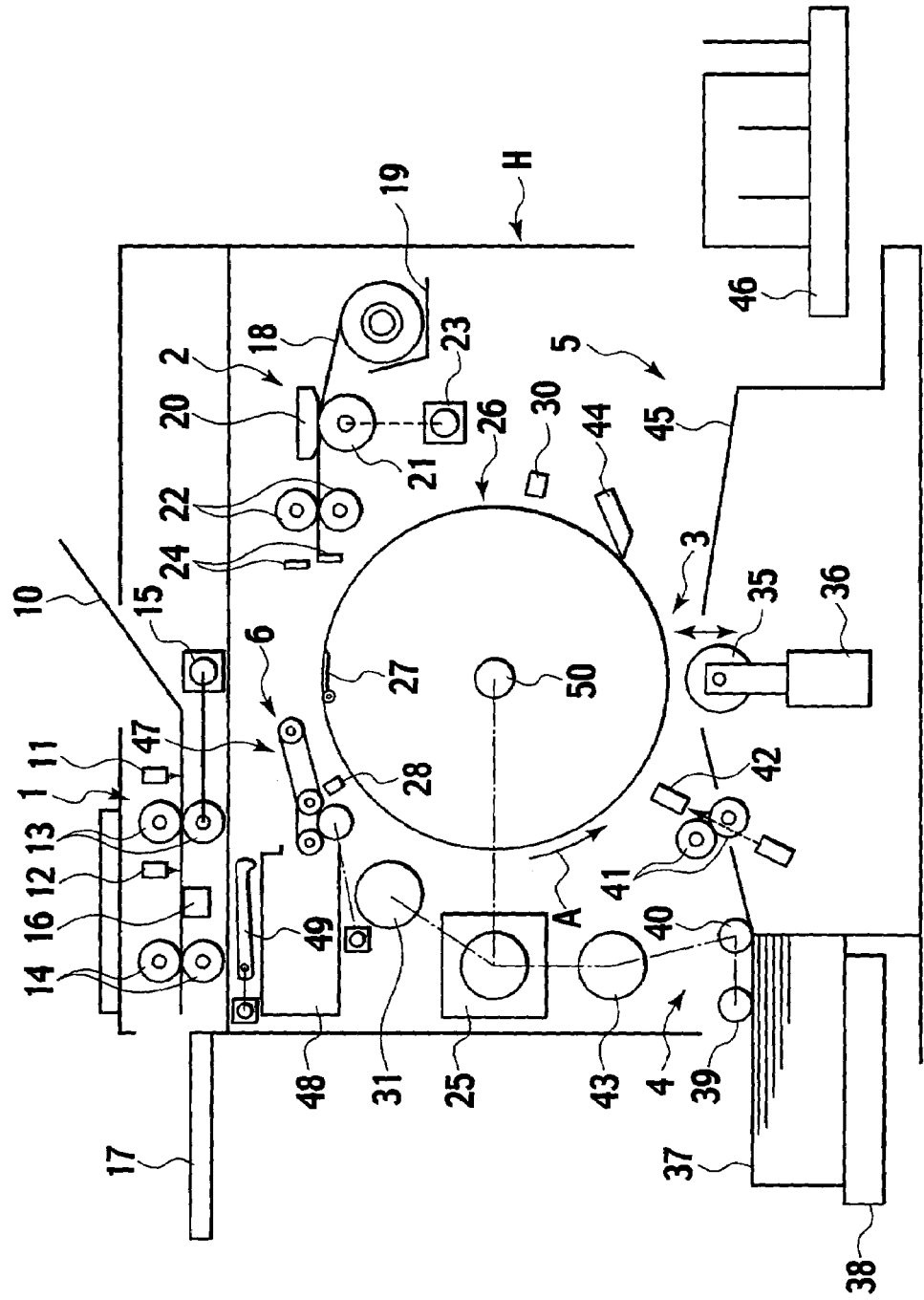
FIG. 1 shows a first embodiment of the stencil printing machine and is a schematic view thereof.

Preferable embodiments of the printing machine will be described hereinbelow referring to the drawings.

Figure 2:
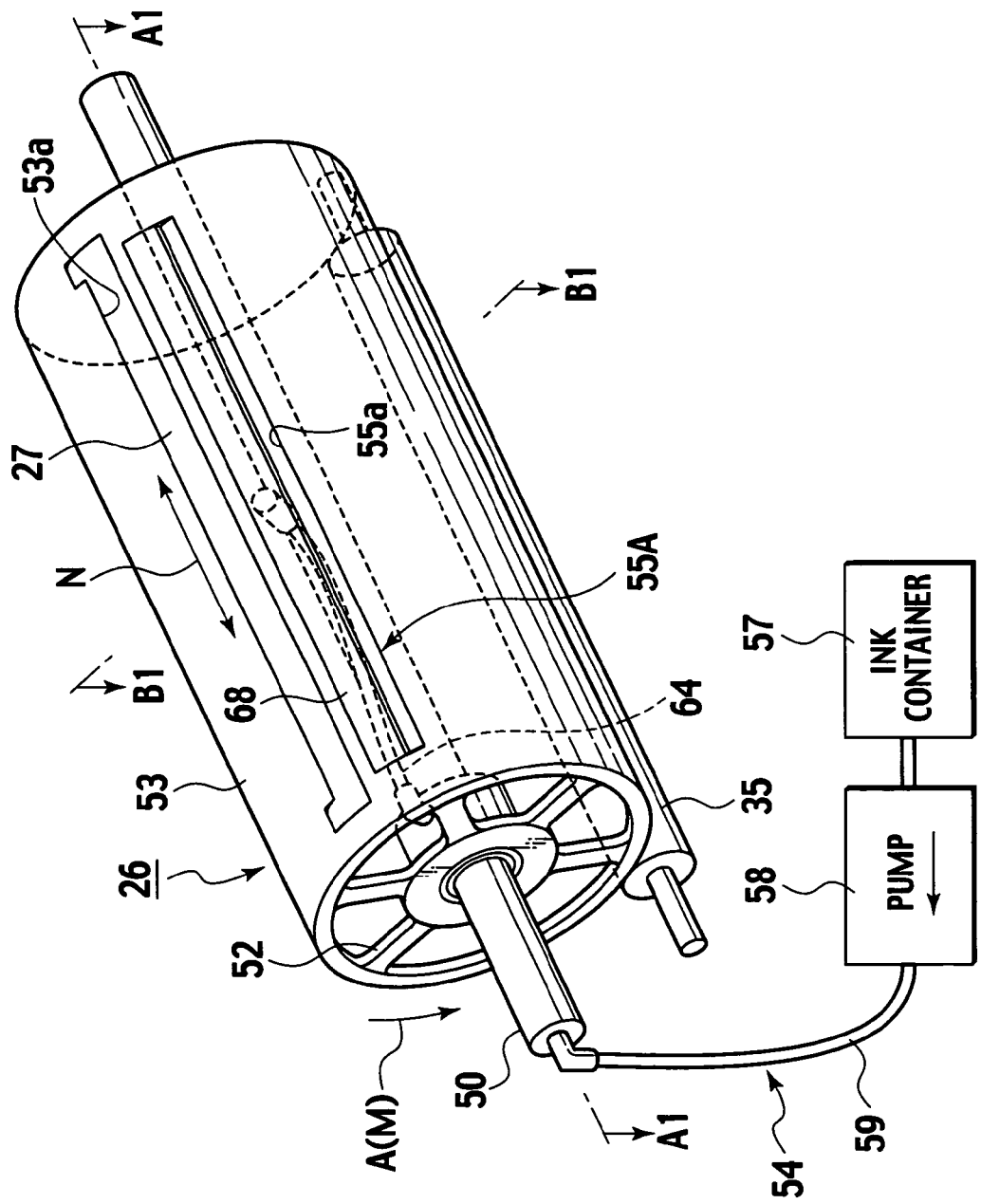
FIG. 2 shows the first embodiment of the stencil printing machine and is a perspective view of a drum.
Figure 3:
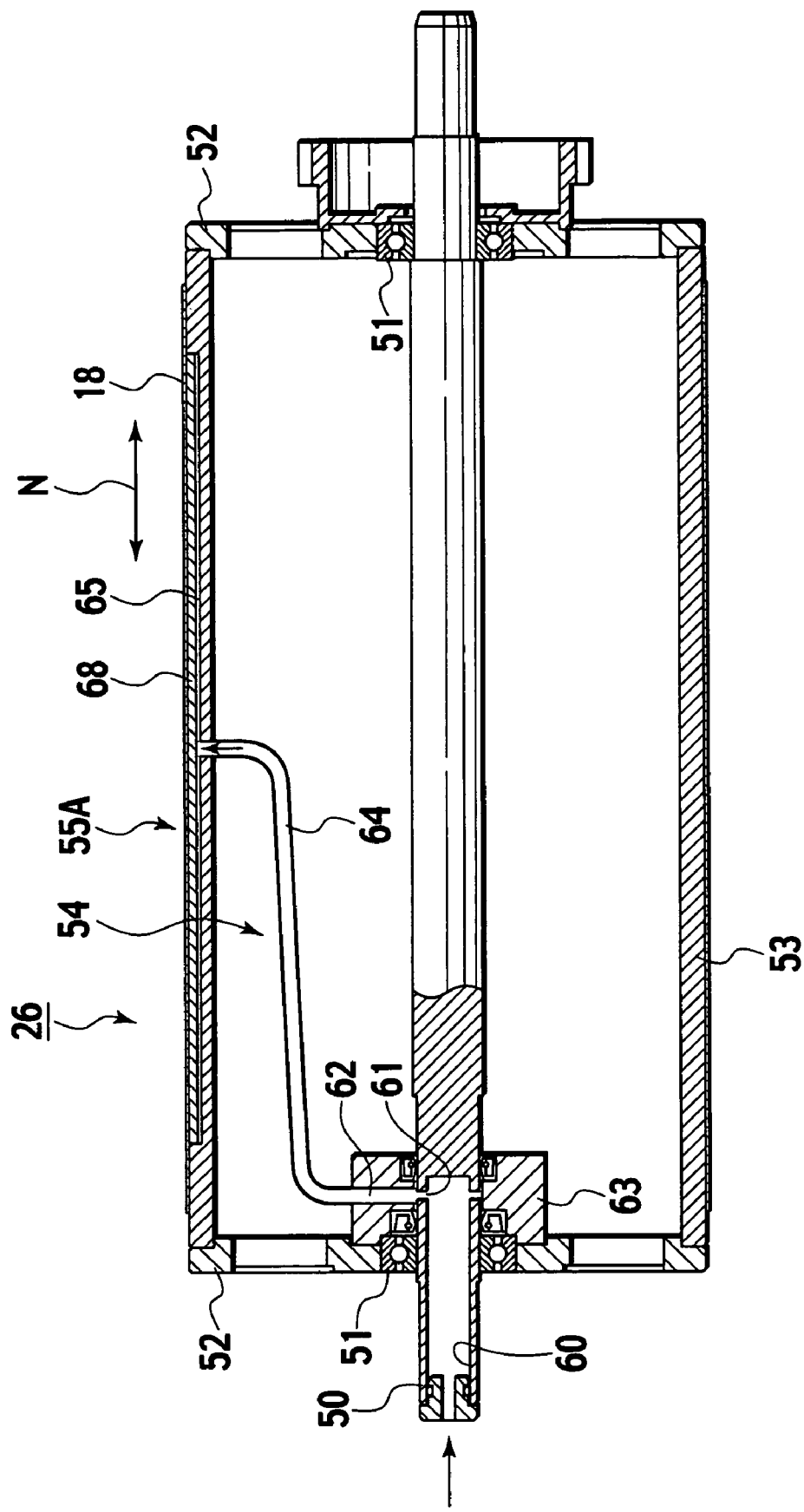
FIG. 3 shows the first embodiment of the stencil printing machine and is a cross-sectional view taken along the line A1-A1 in FIG. 2.
Figure 4:
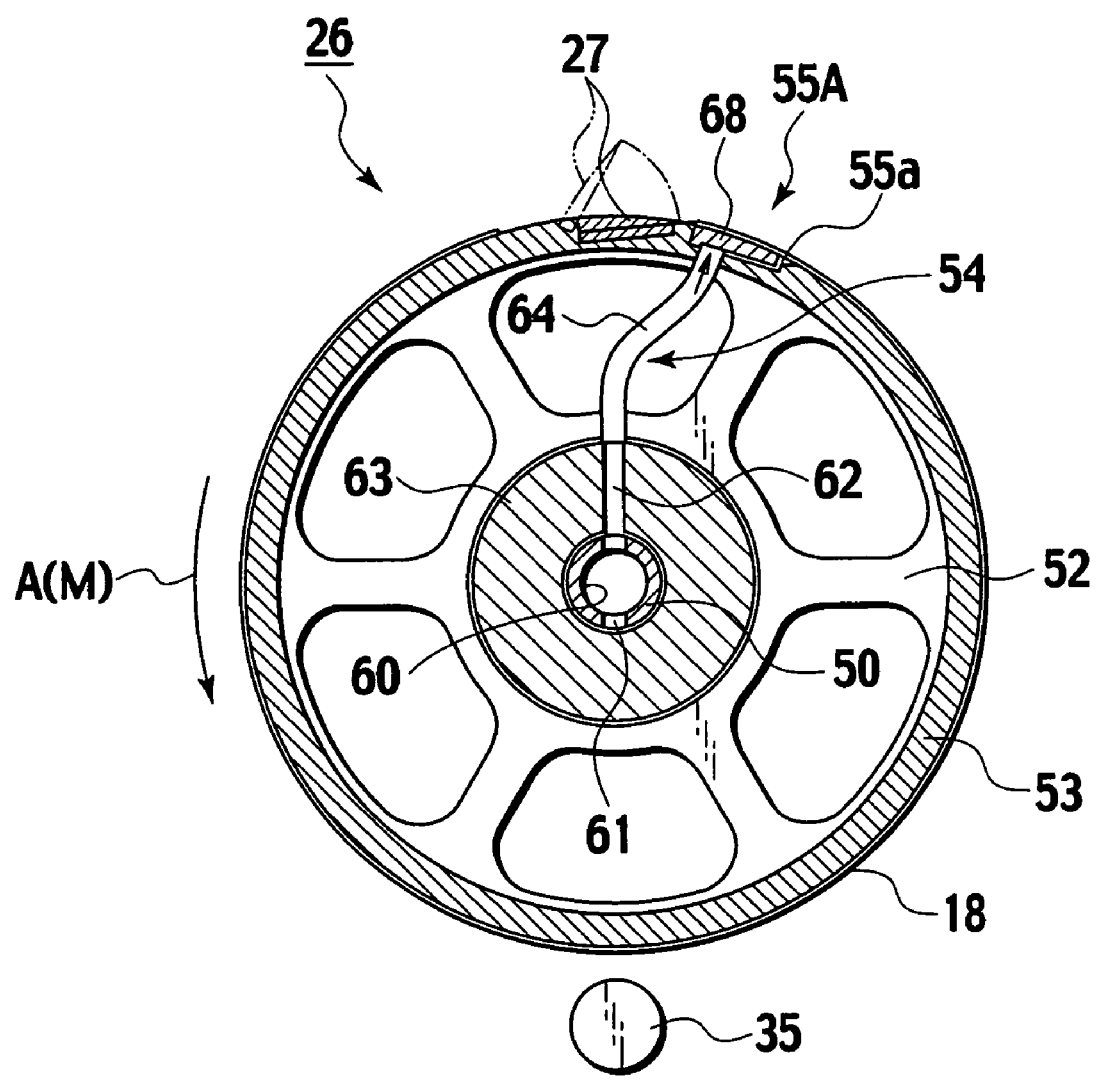
FIG. 4 shows the first embodiment of the stencil printing machine and is a cross-sectional view taken along the line B1-B1 in FIG. 2.
Figure 5:
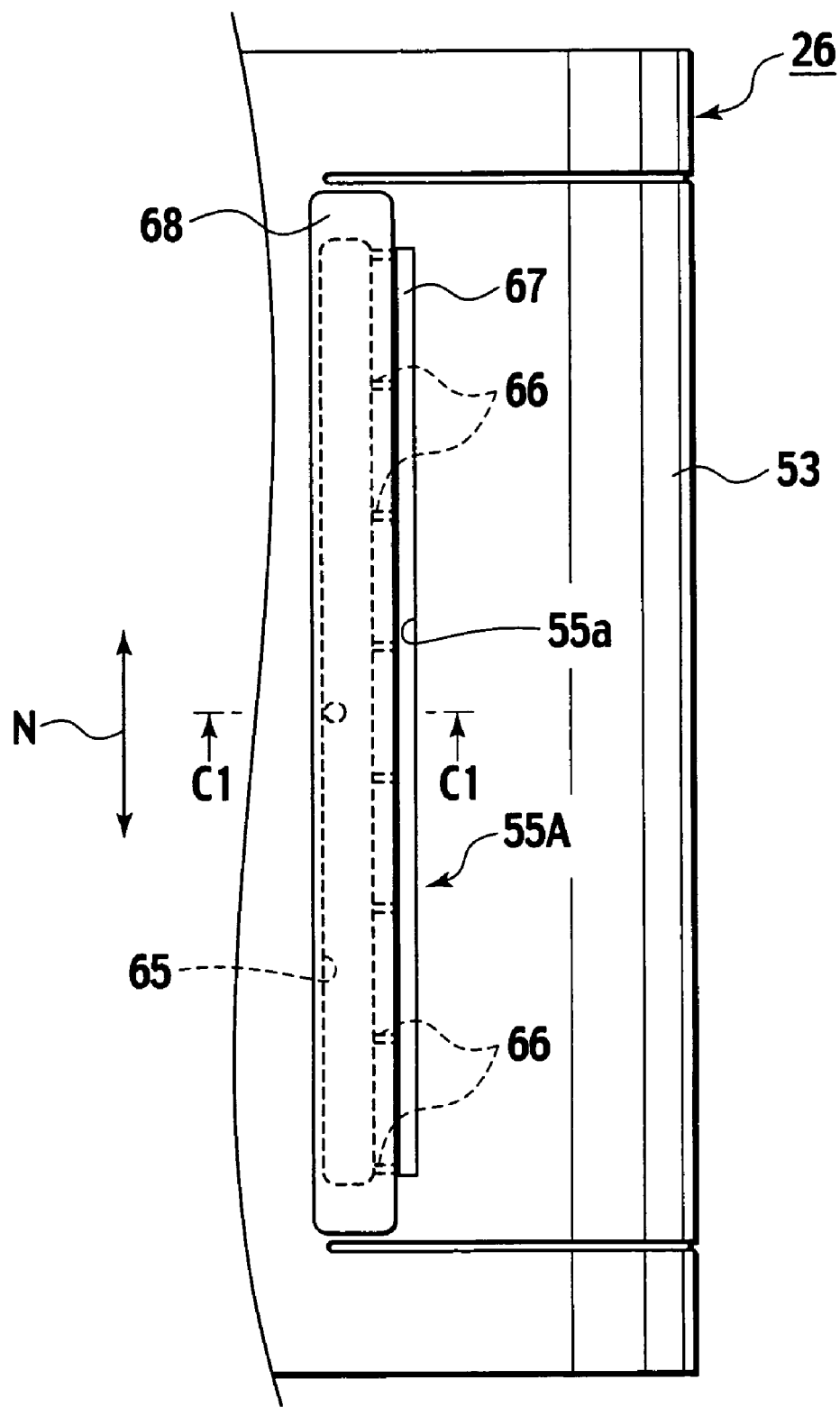
FIG. 5 shows the first embodiment of the stencil printing machine and is a plan view of the drum showing an ink supply unit.
Figure 6:
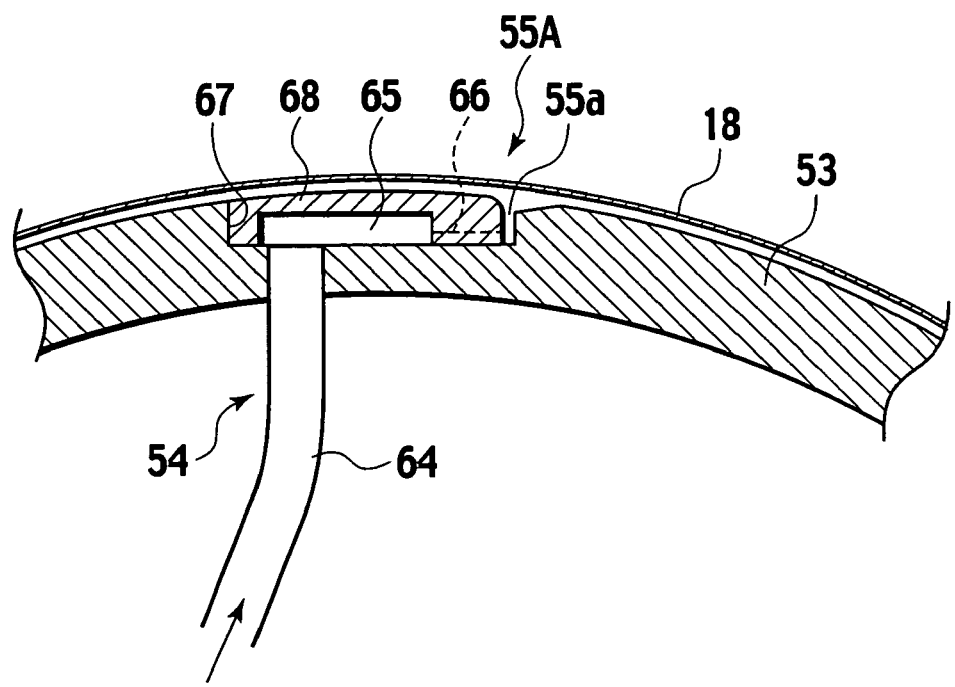
FIG. 6 shows the first embodiment of the stencil printing machine and is a cross-sectional view taken along the line C1-C1 in FIG. 5.
Figure 7:
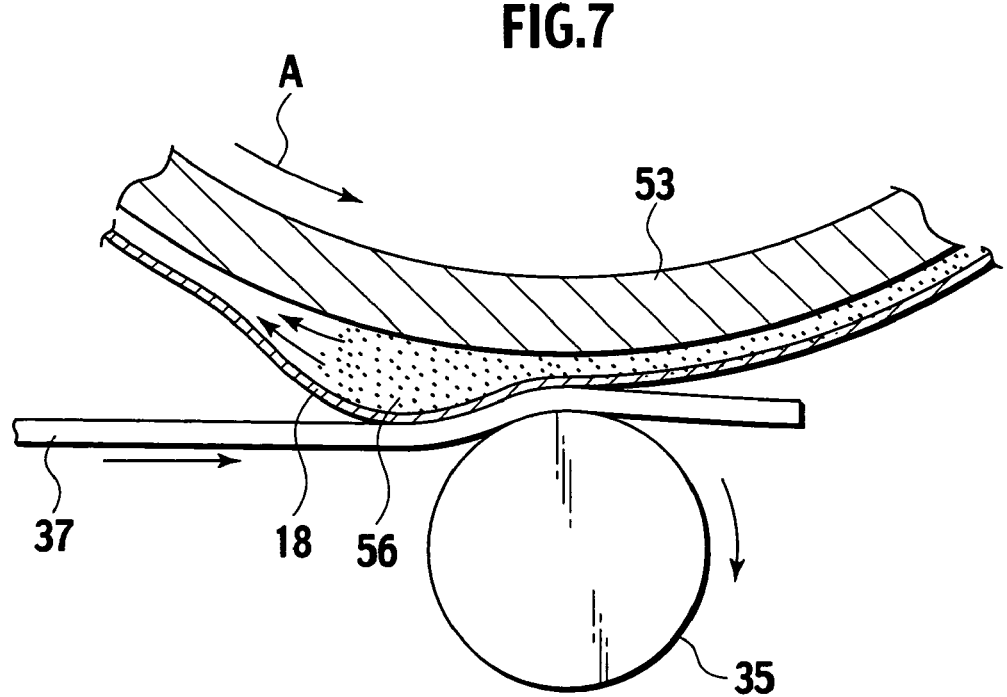
FIG. 7 shows the first embodiment of the stencil printing machine and is a partial cross-sectional view explaining an ink diffusion mechanism.

FIG. 1 shows a schematic view of the stencil printing machine; FIG. 2 shows a perspective view of a drum; FIG. 3 shows a cross-sectional view taken along the line A1-A1 in FIG. 2; FIG. 4 shows a cross-sectional view taken along the line B1-B1 in FIG. 2; FIG. 5 shows a plan view of the drum showing an ink supply unit; FIG. 6 shows a cross-sectional view taken along the line C1-C1 in FIG. 5; and FIG. 7 shows a partial cross-sectional view explaining an ink diffusion mechanism.

As shown in FIG. 1, the stencil printing machine is mainly constructed by an original reading unit 1, a stencil making unit 2, a printing unit 3, a paper feed unit 4, a paper delivery unit 5 and a stencil disposal unit 6.

The original reading unit 1 includes an original setting tray 10 on which the originals to be printed are stacked, reflective-type original sensors 11 and 12 which senses presence of the originals on the original setting tray 10, original conveyer rollers 13 and 14 which convey the original on the original setting tray 10, a stepping motor 15 which drives and rotates the original conveyer rollers 13 and 14 a contact image sensor 16 which optically reads out image data of the original conveyed by the original conveyer rollers 13 and 14 and converts the data into electrical signals, and an original discharging tray 17 on which the originals discharged from the original setting tray 10 are stacked. The original stacked on the original setting tray 10 is conveyed by the original conveyer rollers 13 and 14 and the image sensor 16 reads out the image data of the conveyed originals.

The stencil making unit 2 has a stencil sheet housing 19 which houses a long and rolled stencil sheet 18, a thermal print head 20 placed downstream of this stencil sheet housing 19 in a conveying direction, a platen roller 21 placed at a position opposite to the thermal print head 20, and a pair of stencil sheet transfer rollers 22 and 22 placed downstream of the platen roller 21 and the thermal print head 20 in the conveying direction, a write pulse motor 23 which drives and rotates the platen roller 21 and the stencil sheet transfer rollers 22, and a stencil sheet cutter 24 placed downstream of the pair of stencil sheet transfer rollers 22 and 22 in the conveying direction.

The long stencil sheet 18 is conveyed by the rotation of the platen roller 21 and the stencil sheet transfer rollers 22. Based on the image data read out by the image sensor 16, each of dot-shaped heating elements of the thermal print head 20 selectively performs heating operations, and thereby the stencil sheet 18 is perforated due to thermal sensitivity thereof to make a stencil. Then, the stencil sheet 18 thus made is cut by the stencil sheet cutter 24 to make the stencil sheet 18 with a predetermined length.

The printing unit 3 has a drum 26 which rotates in a direction of an arrow A of FIG. 1 by driving force of a main motor 25, a stencil sheet clamping portion 27 which is provided on the outer peripheral surface of the drum 26 and clamps an end of the stencil sheet 18, a stencil sheet confirming sensor 28 which senses whether or not the stencil sheet 18 is wound and mounted on the outer peripheral surface of the drum 26, a datum position detecting sensor 30 which detects the datum position of the drum 26, and a rotary encoder 31 which detects rotation of the main motor 25. Based on detection output of the datum position detecting sensor 30, an outputted pulse by the rotary encoder 31 is detected, thus enabling the rotation position of the drum 26 to be detected.

In addition, the printing unit 3 has a pressure roller 35 positioned below the drum 26. This pressure roller 35 is constructed to be movable between a press position where the pressure roller 35 presses the outer peripheral surface of the drum 26 by driving force of a solenoid device 36, and a holding position where the pressure roller 35 is spaced apart from the outer peripheral surface of the drum 26. The pressure roller 35 is always placed at the press position during a printing mode period (including trial print) and placed at the holding position during a period other than the printing mode.

Thereafter, the end of the stencil sheet 18 conveyed from the stencil making unit 2 is clamped by the stencil sheet clamping portion 27, and the drum 26 is rotated while the stencil sheet 18 is clamped so that the stencil sheet 18 is wound and mounted on the outer peripheral surface of the drum 26. Then, print paper (print medium) 37, which is fed by the paper feed unit 4 in synchronization with the rotation of the drum 26, is pressed onto the stencil sheet 18 wound and mounted on the outer peripheral surface of the drum 26 by the pressure roller 35. Therefore, ink 56 is transferred from perforations of the stencil sheet 18 onto the print paper 37, and an image is printed.

The paper feed unit 4 has a paper feed tray 38 on which the print paper 37 is stacked, first paper feed rollers 39 and 40 which convey only the print paper 37 at the uppermost position from this paper feed tray 38, and a pair of second paper feed rollers 41 and 41 which convey the print paper 37, which has been conveyed by the first paper feed rollers 39 and 40, between the drum 26 and the pressure roller 35 in synchronization with the rotation of the drum 26, and a paper feed sensor 42 which senses whether or not the print paper 37 is conveyed between the pair of second paper feed rollers 41 and 41. The first paper feed rollers 39 and 40 are constructed so that the rotation of the main motor 25 is selectively transferred thereto through a paper feed clutch 43.

The paper delivery unit 5 has a paper removal claw 44 which removes the printed print paper 37 from the drum 26, a conveying passage 45 through which the print paper 37 removed from the drum 26 by the paper removal claw 44 is conveyed, and a paper receiving tray 46 on which the print paper 37 delivered from the conveying passage 45 is stacked.

The stencil disposal unit 6 has disposed stencil conveying means 47, a stencil disposal box 48 and a disposed stencil compression member 49. The disposed stencil conveying means 47 guides the end of the used stencil sheet 18 unclamped from the outer peripheral surface of the drum 26 and conveys the used stencil sheet 18 that has been guided while peeling it off from the drum 26. The stencil disposal box 48 houses the stencil sheet 18 conveyed by the disposed stencil conveying means 47. The disposed stencil compression member 49 pushes the stencil sheet 18, which has been conveyed by the disposed stencil conveying means 47 into the stencil disposal box 48, into the bottom of the stencil disposal box 48.

As shown in FIGS. 2 to 4, the drum 26 has a support axis 50 fixed to the machine body H (shown in FIG. 1), a pair of side disks 52 and 52 rotatably supported by the support axis 50 through each of bearings 51, and a cylindrical outer peripheral wall 53 fixed between the pair of side disks 52 and 52. The outer peripheral wall 53 is driven and rotated by rotation force of the main motor 25 together with the pair of side disks 52 and 52. The outer peripheral wall 53 is also rigid so as not to deform by the pressure of the pressure roller 35 and formed by an ink impermeable member which does not allow the ink 56 to permeate therethrough. Furthermore, the outer peripheral surface of the outer peripheral wall 53 is processed with fluorine contained resin coating process such as Teflon (registered trademark) coating process and formed to have an even cylindrical surface.

The stencil sheet clamping portion 27 is provided by utilizing a concave portion for clamping 53a formed along an axis direction of the support axis 50 on the outer peripheral wall 53. One end of the stencil sheet clamping portion 27 is rotatably supported by the outer peripheral wall 53. The clamping portion 27 is provided so as to protrude from the outer peripheral wall 53 in an unclamping state as shown by a virtual line in FIG. 4 and so as not to protrude from the outer peripheral wall 53 in a clamping state shown by a solid line in FIG. 4. Therefore, the stencil sheet clamping portion 27 is capable of clamping the stencil sheet 18 without protruding from the outer peripheral wall 53.

The outer peripheral wall 53 is rotated in a direction of an arrow A of FIGS. 2 and 4, and a starting point of printing thereon is set to a position near the stencil sheet clamping portion 27, which is found after a small rotation of the outer peripheral wall 53. Hence, the rotating direction A equals to a printing direction M, and the area below the starting point of printing is set as a printing area. In this first embodiment, a maximum printing area is set to a region in which A3 size print paper can be printed. In addition, an ink supply unit 55A of an ink supply device 54 is provided at an upstream position of the maximum printing area of the outer peripheral wall 53 in the printing direction M.

As shown in FIGS. 2 to 6, the ink supply device 54 includes an ink container 57 in which the ink 56 is stored, an inking pump 58 which suctions the ink 56 within the ink container 57, a first pipe 59 which supplies the ink 56 suctioned by the inking pump 58, the support axis 50 to which the other end of the first pipe 59 is connected and in which an ink passage 60 is formed and a hole 61 is formed at a position 180 degrees opposite thereto, a rotary joint 63 which is rotatably supported on the outer peripheral side of the support axis 50 and in which a through hole 62 that communicates with the hole 61 is formed, a second pipe 64 in which one end thereof is connected to the rotary joint 63 and the other end thereof is connected to the outer peripheral wall 53, and the ink supply unit 55A to which the other end of the second pipe 64 is opened. The first pipe 59, the support axis 50 and the second axis 64 and the like constitute a conduit for supplying ink between the surface of the outer peripheral wall 53 of the drum 26 and the stencil sheet 18 without expose ink to the atmosphere.

The ink supply unit 55A includes an ink diffusion groove 65 which diffuses the ink 56 from the second pipe 64 in a printing perpendicular direction N, a plurality of through holes 66 which are opened at an interval in the ink diffusion groove 65 in the printing perpendicular direction N, and an ink supply port 55a which communicates with the plurality of through holes 66 and is opened to the surface of the outer peripheral wall 53. The ink supply unit 55A is covered and closed up by the stencil sheet 18 for supplying ink between the surface of the outer peripheral wall 53 of the drum 26 and the stencil sheet 18 without expose ink to the atmosphere.

As shown in FIGS. 5 and 6, the ink diffusion groove 65 and the plurality of through holes 66 as well as the ink supply port 55a are formed by a concave portion for ink supply 67 and an ink distribution member 68. The concave portion for ink supply 67 is formed along a perpendicular direction to the printing direction M (i.e., the printing perpendicular direction N) on the outer peripheral wall 53, and the ink distribution member 68 is formed inside of the concave portion 67. The ink supply port 55a is formed along the printing perpendicular direction N and supplies the ink 56 almost uniformly in the printing perpendicular direction N on the outer peripheral wall 53.

Next, an operation of the stencil printing machine with the above-mentioned structure will be briefly described.

First of all, when a stencil making mode is selected, in the stencil making unit 2, the stencil sheet 18 is conveyed by rotation of the platen roller 21 and the stencil sheet transfer rollers 22. Then, based on image data read out by the original reading unit 1, the multiple heating elements of the thermal printing head 20 selectively perform heating operations, and thereby the stencil sheet 18 is perforated due to its thermal sensitivity to make the stencil. The stencil sheet 18 thus made is cut at predetermined positions, and thus the stencil sheet 18 with a predetermined dimension is made.

In the printing unit 3, an end of the stencil sheet 18 made in the stencil making unit 2 is clamped by the stencil sheet clamping portion 27 of the drum 26, and the drum 26 is rotated while clamping the stencil sheet 18. The stencil sheet 18 is then wound and mounted on the outer peripheral surface of the drum 26.

Next, when the printing mode is selected, in the printing unit 3, the drum 26 is driven and rotated, and the ink supply device 54 starts driving. Then, the ink 56 is supplied to the outer peripheral wall 53 from the ink supply port 55*a*. Thereafter, the supplied ink 56 is held between the outer peripheral wall 53 and the stencil sheet 18, and the pressure roller 35 is moved from the holding position to the press position.

In the paper feed unit 4, the print paper 37 is fed between the drum 26 and the pressure roller 35 in synchronization with the rotation of the drum 26. The fed print paper 37 is pressed by the pressure roller 35 onto the outer peripheral wall 53 of the drum 26 and conveyed by the rotation of the outer peripheral wall 53 of the drum 26, that is, the print paper 37 is conveyed while closely contacting the stencil sheet 18.

Further, as shown in FIG. 7, as the print paper 37 is conveyed, the ink 56 held between the outer peripheral wall 53 of the drum 26 and the stencil sheet 18 is simultaneously diffused downstream in the printing direction M while being squeezed by the pressure of the pressure roller 35. Then, the diffused ink 56 oozes from perforations of the stencil sheet 18 and is transferred on the print paper 37. Accordingly, an ink image is printed on the print paper 37 in a process of passing between the outer peripheral wall 53 of the drum 26 and the pressure roller 35. The end of the print paper 37 which has passed between the outer peripheral wall 53 of the drum 26 and the pressure roller 35 is peeled off from the drum 26 by the paper removal claw 44 at its end, and the print paper 37 removed from the drum 26 is delivered to the paper receiving tray 46 through the conveying passage 45 and stacked thereon.

Once printing of a set quantity of the printing paper is completed, the rotation of the outer peripheral wall 53 of the drum 26 is stopped and the ink supply device 54 stops driving. Consequently, supply of the ink 56 to the outer peripheral wall 53 is stopped. The pressure roller 35 is returned back to the holding position from the press position and goes into a holding mode.

When a stencil disposal mode is selected for starting new stencil making or the like, the stencil sheet clamping position 27 of the drum 26 is moved to an unclamping position, and the end of the unclamped stencil sheet 18 is guided by the disposed stencil conveying means 47 as the drum 26 rotates and then housed in the stencil disposal box 48.

As described so far, in this stencil printing machine, the ink 56 is supplied to the outer peripheral wall 53 of the drum 26 and diffused on the outer peripheral wall 53 by being squeezed by pressure force of the pressure roller 35, and the diffused ink 56 is transferred onto the print paper 37 from the perforations of the stencil sheet 18 by the pressure force of the pressure roller 35. Therefore, when the printing mode is finished, the ink 56 supplied to the drum 26 is held in an approximately sealed space between the outer peripheral wall 53 of the drum 26 and the stencil sheet 18, thus contact with the atmosphere is minimized. Accordingly, the ink 56 does not deteriorate even when printing is not carried out for a long time, and the deterioration of the ink 56 can be certainly prevented. Moreover, it is not required to place various rollers for supplying ink within the drum 26 like the conventional examples. Therefore, the drum 26 can be made even smaller and light-weighted.

Moreover, since the outer peripheral wall 53 of the drum 26 is formed by the ink impermeable member, a materials therefor can be selected from a wider range of varieties. In addition, since the structure is simple, the drum 26 can be manufactured at low cost. Furthermore, since strength of the drum 26 is easily increased, a non-uniform image due to fluctuations of the printing pressure can be prevented.

Moreover, since the ink 56 is basically prevented from contacting the atmosphere to a minimum, the ink 56 is used for printing in the best condition with almost no deterioration. Furthermore, since no cares are required for preventing deterioration of the ink 56, there is a higher degree of flexibility in selecting the ink 56.

In this first embodiment, the ink supply unit 55A includes ink supply port 55*a* formed continuously along the printing perpendicular direction N and supplies the ink 56 through the ink supply port 55*a* almost uniformly in the printing perpendicular direction N. Accordingly, the ink 56 can be diffused in the printing perpendicular direction N without unevenness when the ink 56 is diffused downstream in the printing direction M while being squeezed by the pressure of the pressure roller 35. Thus, non-uniform density in printing perpendicular direction N can be certainly prevented.

In the first embodiment, since the stencil sheet clamping portion 27 does not protrude from the surface of the outer peripheral wall 53 of the drum 26, driving of the pressure roller 35 is easy. This means that it is not required to move the pressure roller 35 between the press position and the holding position for every rotation of the drum 26 in order for the pressure roller 35 to avoid coming into collision with the stencil sheet clamping portion 27. In virtue of this, deficiencies such as noise from the pressure roller 35 and image deterioration due to rebounding can be eliminated.

Figure 8:
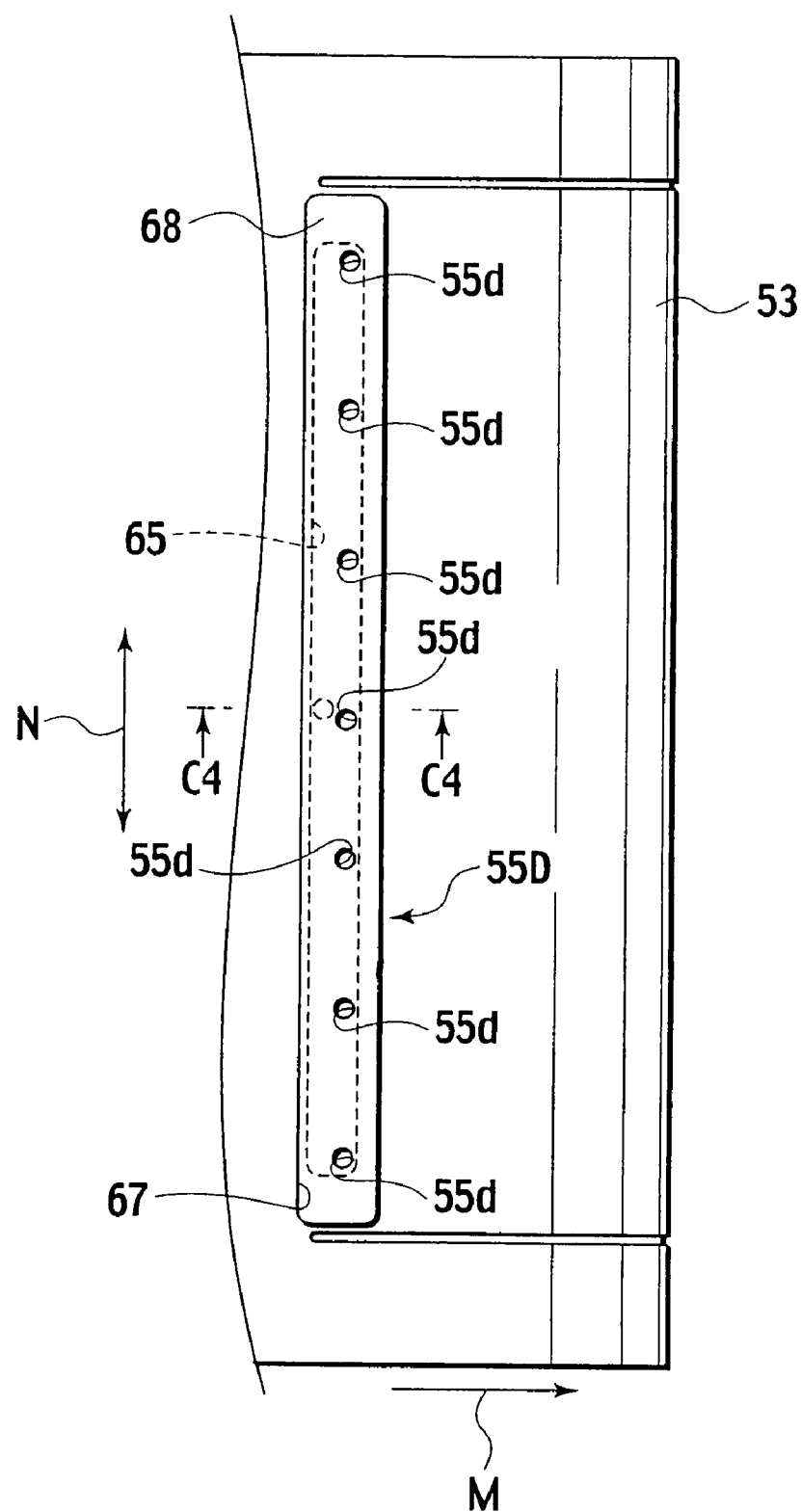
FIG. 8 shows a modification of the ink supply unit of the first embodiment and is a plan view of a part of the drum.
Figure 9:
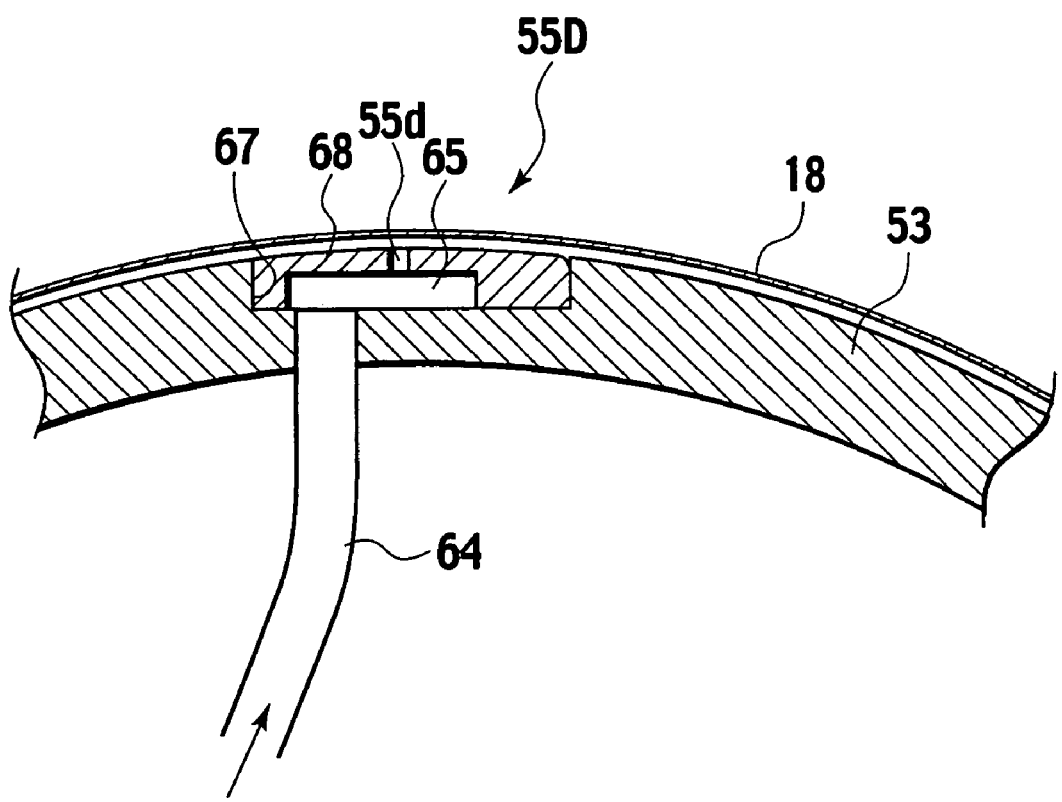
FIG. 9 shows the modification of the ink supply unit of the first embodiment and is a cross-sectional view taken along the line C4-C4 in FIG. 8.

FIGS. 8 and 9 show a modification of the ink supply unit. FIG. 8 is a plan view of a part of the drum showing the ink supply unit, and FIG. 9 is a cross-sectional view taken along the line C4-C4 in FIG. 8.

As shown in FIGS. 8 and 9, an ink supply unit 55D of this modification includes the ink diffusion groove 65 which diffuses the ink from the second pipe 64 in the printing perpendicular direction N, and a plurality of ink supply ports 55*d*, serving as the ink diffusing supply portions, whose one ends are opened at an interval in the printing perpendicular direction N in the ink diffusion groove 65 and the other ends are opened to the surface of the outer peripheral wall 53. The ink diffusion groove 65 and the ink supply ports 55*d* are formed by the concave portion for ink supply 67, formed along the printing perpendicular direction N on the outer peripheral wall 53, and the ink distribution member 68 placed inside the concave portion 67.

The ink supply unit 55D of this modification supplies the ink 56 onto the outer peripheral wall 53 in the state of being diffused uniformly toward the entire peripheries of the ink supply ports 55*d*. Thus, when viewing the outer peripheral wall 53 as a whole in the printing perpendicular direction N, the ink 56 is almost uniformly supplied in the printing perpendicular direction N. Therefore, similarly to the first embodiment, when the ink 56 is diffused downstream in the printing direction M by being squeezed by the pressing force of the pressure roller 35, the ink 56 is diffused in the printing perpendicular direction N without unevenness. Therefore, nonuniform printing densities in the printing perpendicular direction N is certainly prevented.

Further, with the ink supply unit 55D of this modification, the pressure roller 35 is not depressed into the ink supply ports 55d when passing over the ink supply ports 55d. Therefore, depression noise and vibration of the pressure roller 35 can be prevented.

In a second embodiment, this stencil printing machine is preferably provided with ink leakage preventing grooves on the above-mentioned outer peripheral wall at positions outside the maximum printing area and covered by the stencil sheet. In this way, when the ink between the outer peripheral wall and the stencil sheet leaks outside the maximum printing area, the leaked ink goes into the ink leakage preventing grooves, thus reliably preventing the ink from leaking past the edge of the stencil sheet.

Furthermore, it is preferable for the ink leakage preventing grooves to be provided outside the maximum printing area at right and left positions perpendicular to the printing direction in order to reliably prevent the ink from leaking past the sides of the outer peripheral wall; to be provided at a printing position downstream of the maximum printing area in order to reliably prevent the ink from leaking past the end of the outer peripheral wall; to be provided at a printing position further upstream of the above-mentioned ink supply unit upstream of the maximum printing area in order to reliably prevent the ink from leaking past the top of the outer peripheral wall (thus preventing incomplete clamping, incomplete plate setting, creasing of the stencil sheet, etc. due to the stencil sheet clamping portion being stained by ink); and to be provided as a plurality thereof in order to more reliably prevent ink leakage and in order to prevent the stencil sheet from sinking into the ink leakage preventing grooves by making the width of the ink leakage preventing grooves small.

Figure 10:
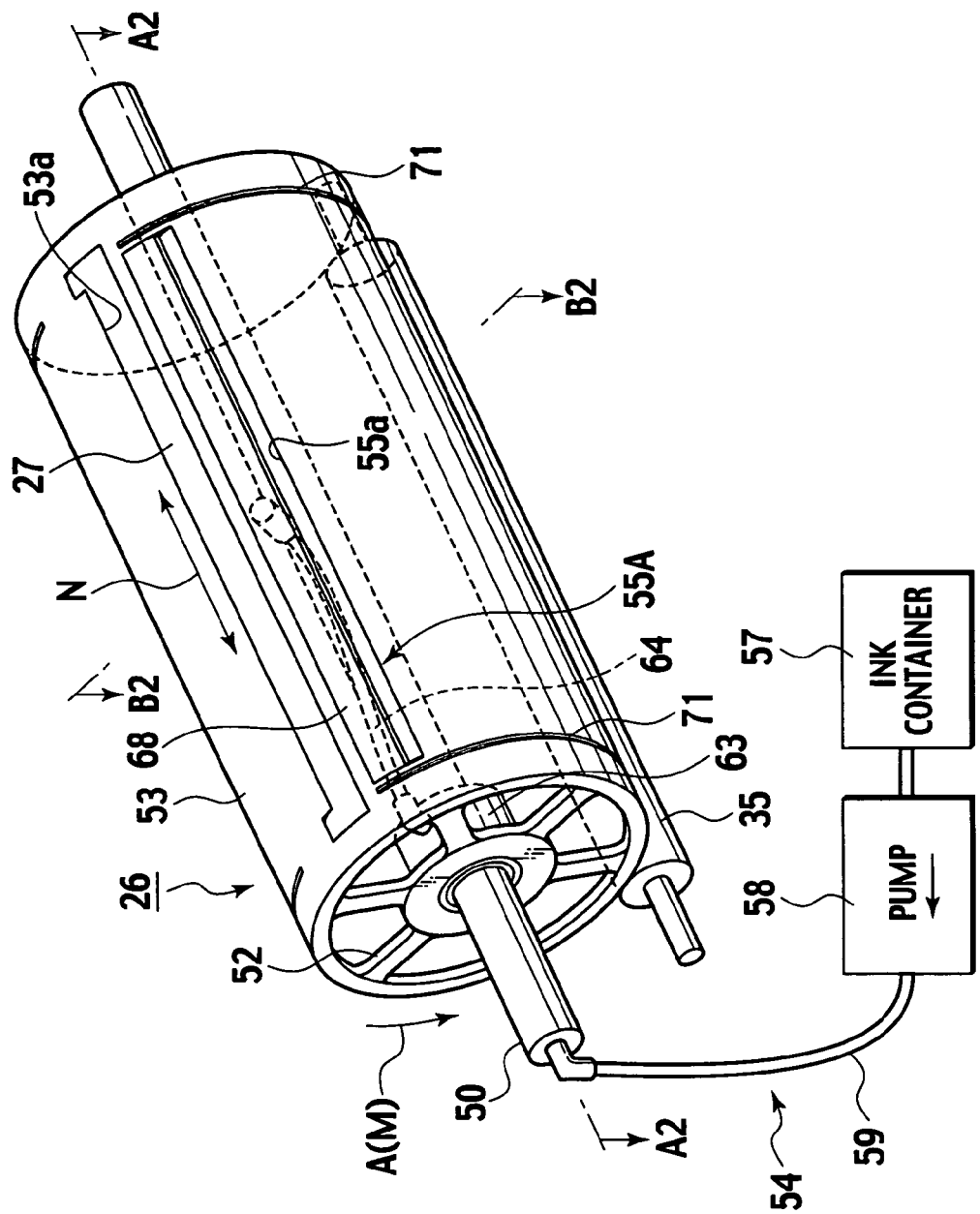
FIG. 10 shows a second embodiment of the stencil printing machine and is a perspective view of a drum.
Figure 11:
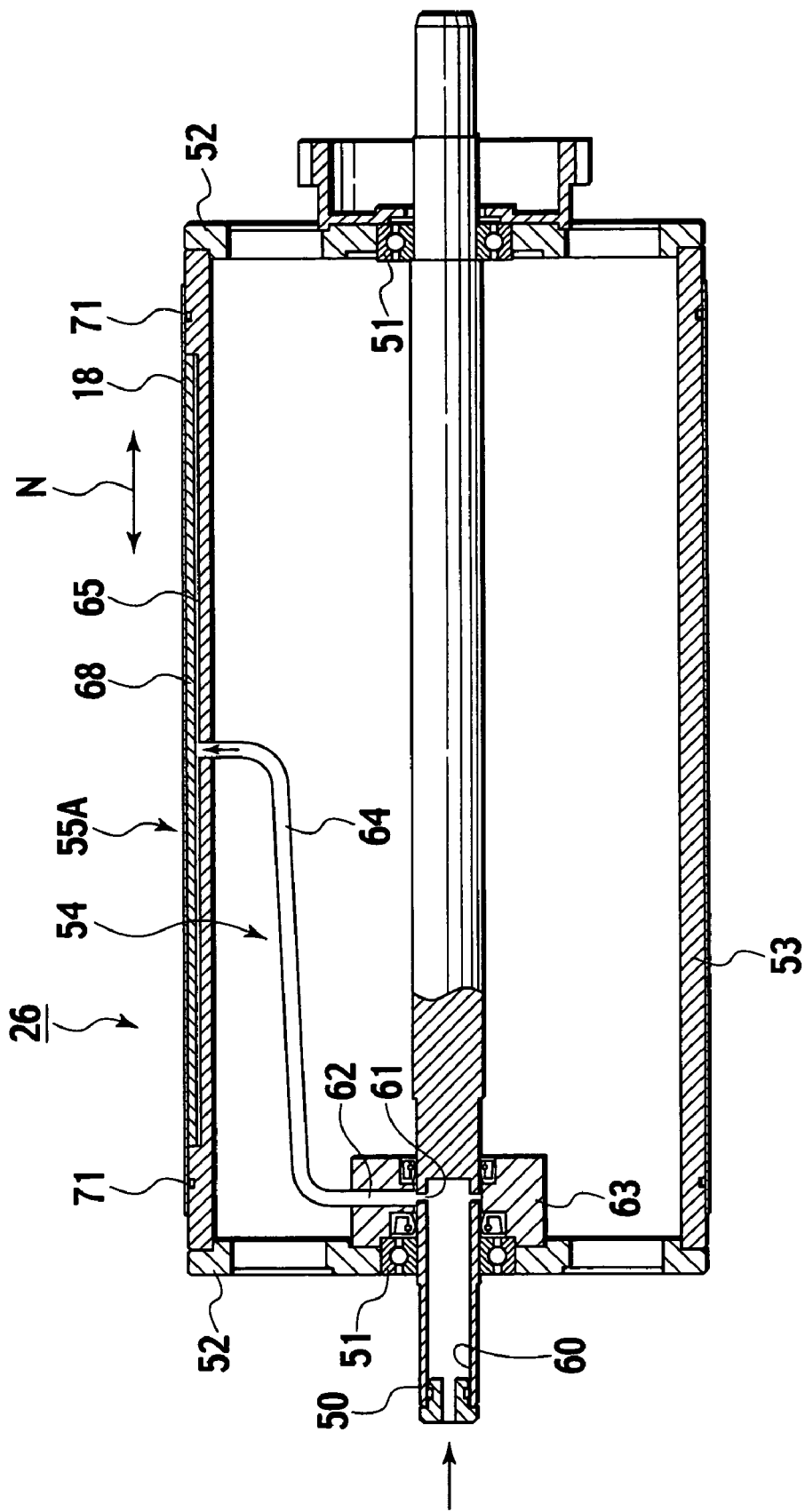
FIG. 11 shows the second embodiment of the stencil printing machine and is a cross-sectional view taken along the line A2-A2 in FIG. 10.
Figure 12:
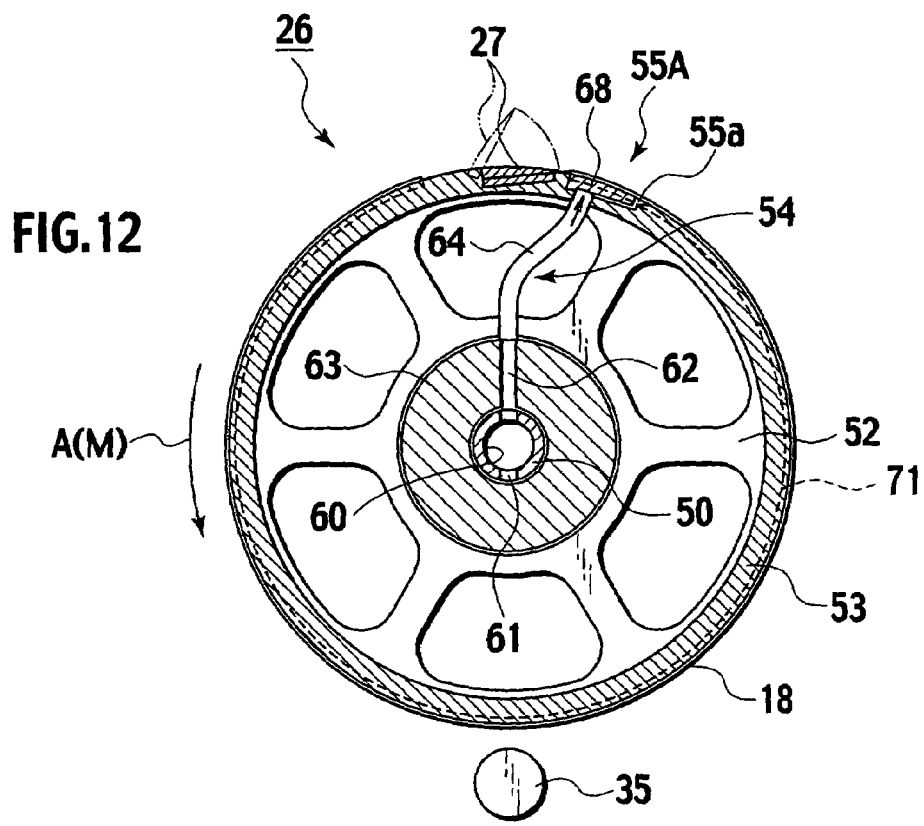
FIG. 12 shows the second embodiment of the stencil printing machine and is a cross-sectional view taken along the line B2-B2 in FIG. 10.
Figure 13:
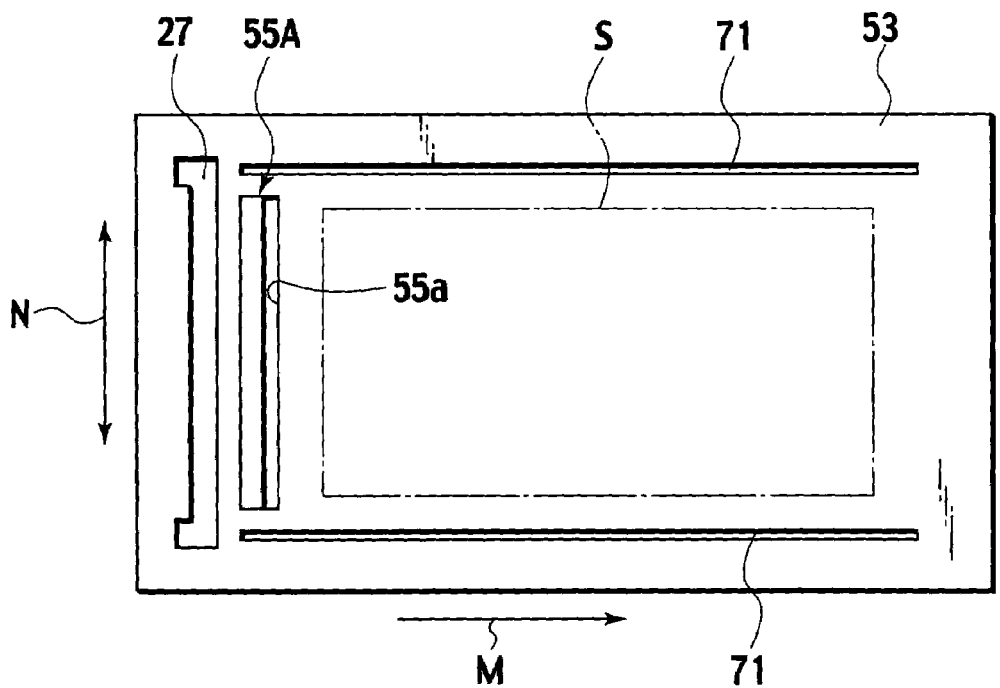
FIG. 13 shows the second embodiment of the stencil printing machine and is a schematic view of an exploded outer peripheral wall of the drum.

FIGS. 10 to 13 show this second embodiment. FIG. 10 is a perspective view of the drum; FIG. 11 is a cross-sectional view taken along the line A2-A2 in FIG. 10; FIG. 12 is a cross-sectional view taken along the line B2-B2 in FIG. 10; and FIG. 13 is a schematic view of the exploded outer peripheral wall of the drum.

As shown in FIGS. 10 to 13, in the second embodiment, ink leakage preventing grooves 71 are provided at positions outside of a maximum printing area S of the outer peripheral wall 53 of the drum 26 and covered with the stencil sheet 18. Further, these ink leakage preventing grooves 71 are provided at positions on the right and left sides as well as outside of the maximum printing area S in the printing perpendicular direction N. Furthermore, the ink leakage preventing grooves 71 are continuously formed along the printing direction M and over a range wider than the maximum printing area S in the printing direction M. Specifically, in order to prevent the leakage of the ink 56 even if the ink 56 is diffused in a horizontal direction from the ink diffusion groove 65 and the ink supply port 55a, ends 71c of the ink leakage preventing grooves 71 are preferably arranged at least at the same position as an ink supply position in a drum rotation direction. Moreover, the ink leakage preventing grooves 71 are arranged about 10 mm outside the widths of the ink diffusion groove 65 and the ink supply port 55a of the ink supply unit 55A. Note that the rest of the construction is the same as the foregoing first embodiment. Therefore, the same constituents as those in the first embodiment are designated by the same reference numerals, and detailed description thereof is omitted.

In the second embodiment, similarly to the first embodiment, the ink 56 does not deteriorate even when printing is not carried out for a long time. Furthermore, the small and light-weighted drum 26 can be realized.

Moreover, in the second embodiment, the ink leakage preventing grooves 71 are provided at the positions on the right and left sides as well as outside of the maximum printing area S in the printing perpendicular direction N. Therefore, the ink 56 leaking from the maximum printing area S of the outer peripheral wall 53 in the printing perpendicular direction N goes into the ink leakage preventing grooves 71, and thereby the ink leakage from the sides of the outer peripheral wall 53 can be certainly prevented.

In a third embodiment, this stencil printing machine preferably has ink recovery means for recovering the ink that has flowed outside the maximum printing area of the outer peripheral wall. It is thereby possible to remove excessive ink from the outer peripheral wall of the drum and reuse the ink.

Furthermore, this ink recovery means has an ink recovery groove at a printing position downstream of the maximum printing area of the outer peripheral wall in order to remove from the outer peripheral wall of the drum the ink that has flowed to the printing downstream side by being squeezed by the pressure roller and reuse it; it is preferable to recover the ink collected in the ink recovery groove, and it is more preferable for the ink recovery groove to be provided with a sinking prevention member through which the ink can pass. The stencil sheet is prevented from sinking into the ink recovery groove by this sinking prevention member, and it is possible to prevent the recovery efficiency from being degraded by the stencil sheet blocking the ink recovery pathway of the ink recovery groove. Moreover, the ink is not sealed by the stencil sheet at a position where the stencil sheet sticks to the edge of the ink recovery groove, and the ink flows smoothly into the ink recovery groove by being squeezed by the pressure roller, thereby preventing the ink from leaking past the end. Furthermore, since the pressure roller does not sink into the ink recovery groove when passing over the ink recovery groove, sound and vibration caused by the pressure roller sinking can be prevented.

This sinking prevention member is preferably flush with the outer peripheral wall of the drum. This enables the pressure roller to move on substantially the same circumference, and sound and vibration caused by the pressure roller sinking can be prevented completely. Furthermore, since the ink recovery means reliably removes the ink collected in the ink leakage preventing groove and reuses the ink, it is preferable to use the ink leakage preventing groove as the ink recovery groove and recover the ink collected in the ink leakage preventing groove.

Figure 14:
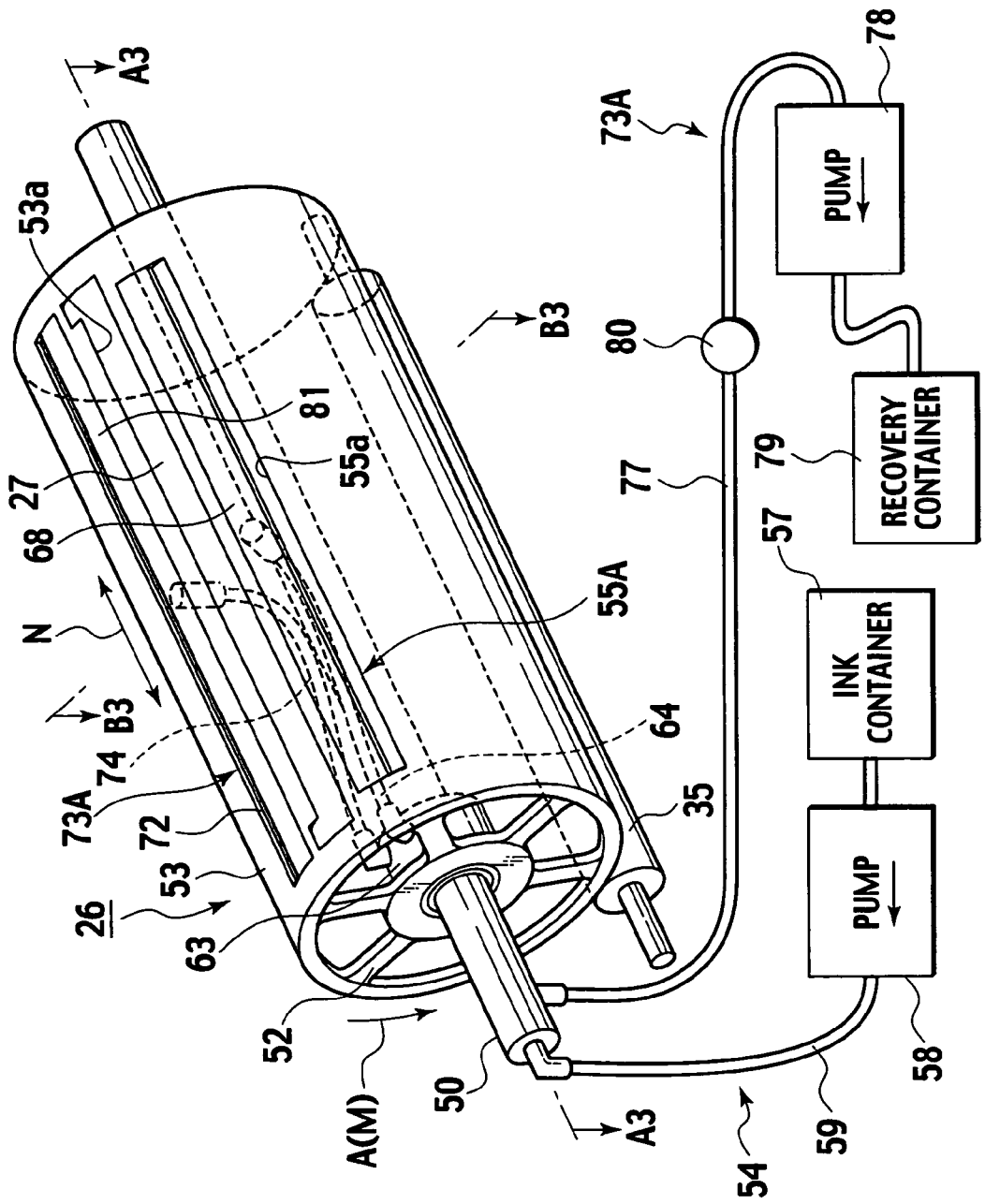
FIG. 14 shows a third embodiment of the stencil printing machine and is a perspective view of a drum.
Figure 15:
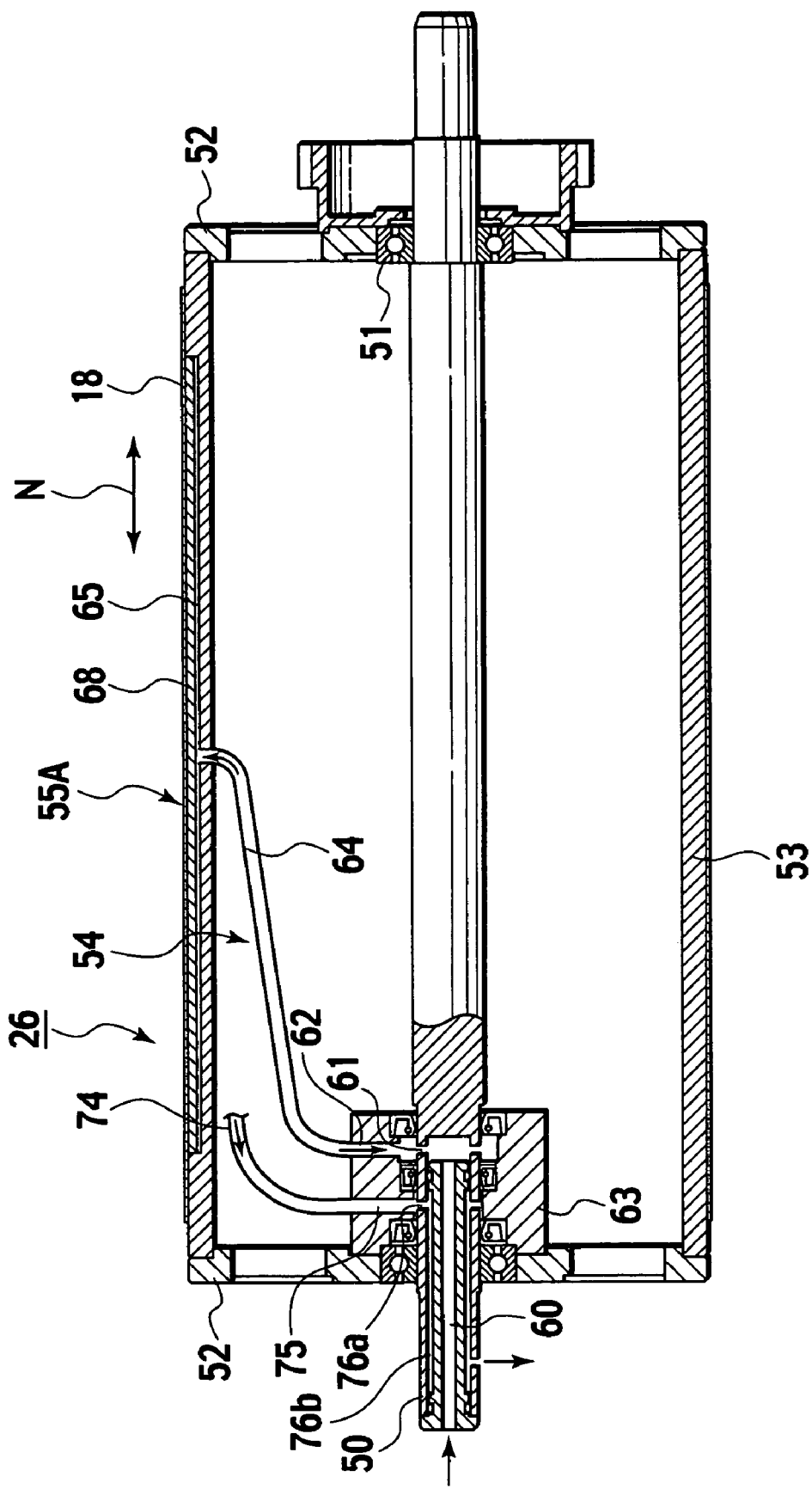
FIG. 15 shows the third embodiment of the stencil printing machine and is a cross-sectional view taken along the line A3-A3 in FIG. 14.
Figure 16:
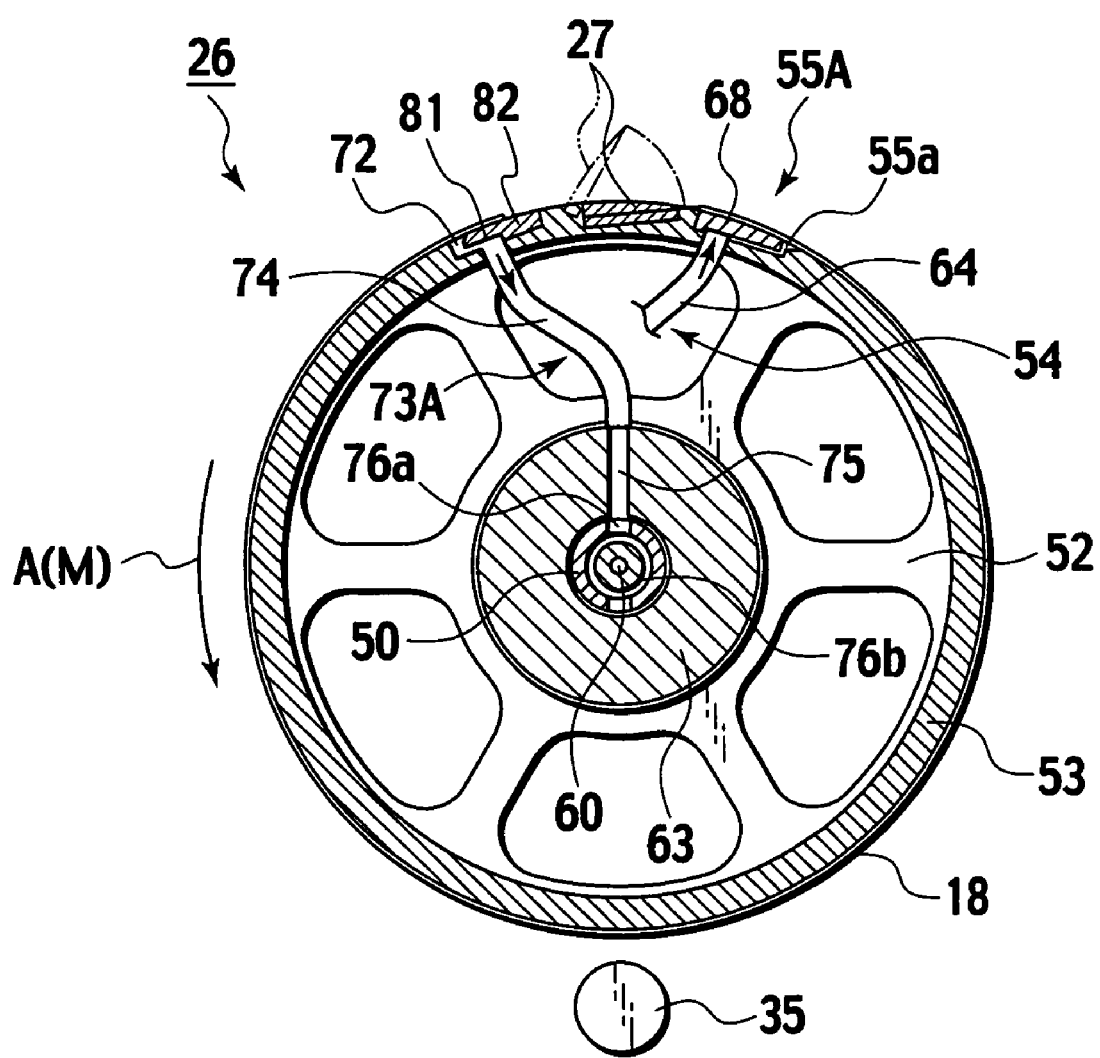
FIG. 16 shows the third embodiment of the stencil printing machine and is a cross-sectional view taken along the line B3-B3 in FIG. 14.

FIGS. 14 to 16 show this third embodiment. FIG. 14 is a perspective view of the drum; FIG. 15 is a cross-sectional view taken along the line A3-A3 in FIG. 14; and FIG. 16 is a cross-sectional view taken along the line B3-B3 in FIG. 14.

As shown in FIGS. 14 to 16, in the third embodiment, in comparison with the first embodiment, an ink recovery device 73A which recovers the ink 56 leaking from the maximum printing area S of the outer peripheral wall 53 is added.

This ink recovery device 73A includes the ink leakage preventing groove 72 formed at the printing position downstream of the maximum printing area S of the outer peripheral wall 53, a third pipe 74 to which one end of the ink leakage preventing groove 72 is opened, the rotary joint 63 to which the other end of the third pipe 74 is connected and in which a through hole 75 is formed, the support axis 50 which rotatably supports the rotary joint 63 and has a hole 76a that can communicate with the through hole 75 and ink passage 76b formed therein, a fourth pipe 77 one end of which is connected to the support axis 50, a filter 80 intervening the middle of the fourth pipe 77 and trapping paper particles and the like, an inking pump (for example, a trochoid pump) 78 which is placed in the middle of the fourth pipe 77 and suctions the ink 56 within the fourth pipe 77, and a recovery container 79 to which the other end of the fourth pipe 77 is connected.

The ink leakage preventing groove 72 is placed at the printing position downstream of the maximum printing area S and formed continuously along the printing perpendicular direction N. However, one end of the third pipe 74 is connected to the ink leakage preventing groove 72. Therefore, the ink leakage preventing groove 72 is formed by utilizing a concave portion for ink recovery 81 and a pipe fixing member 82 formed in the concave portion 81. The rotary joint 63 used herein is also used for the ink supply device 54. The support axis 50 has a double pipe structure as it is used for an ink passage for the ink supply device 54. The rest of the construction is the same as that of the foregoing first embodiment. Therefore, the same constituents are designated by the same reference numerals, and detailed description thereof is omitted.

In the third embodiment, similarly to the first embodiment, the ink 56 does not deteriorate either even when printing is not carried out for a long time. Further, the small and light-weighted drum 26 can be realized.

In the third embodiment, the ink recovery device 73A is provided, which recovers the ink 56 leaking outside of the maximum printing area S of the outer peripheral wall 53. Therefore, the excessive ink 56 can be removed from the outer peripheral wall 53 of the drum 26, and recycling of the ink 56 can be realized. In addition, since the ink stored in the ink leakage preventing groove 72 can be recovered, the ink 56 can be certainly prevented from overflowing from the ink leakage preventing groove 72.

In the third embodiment, the ink container 57 for ink supply and the ink recovery container 79 for ink recovery are provided. Therefore, the recovered ink may not be recycled.

In the third embodiment, the filter 80 intervenes the way of the fourth pipe 77 of the ink recovery device 73A, the ink which does not contain paper particles and the like can be surely returned to the ink recovery container 79. Thus, the quality of the recovered ink can be improved. However, the filter 80 is not always necessary to recover the ink, and the filter 80 may be omitted.

In the third embodiment, when the ink supply device 54 and the ink recovery device 73A are controlled so that they are always driven in the printing mode, the ink is continuously supplied to the outer peripheral wall 53 from the ink supply unit 55A in the printing mode. Then, the ink 56 that has flown into the ink leakage preventing groove 72 from the outer peripheral wall 53 is always recovered. Therefore, the ink 56 is prevented from being built up on the outer peripheral wall 53 as soon as possible. Further, an adequate volume of the ink 56 can be always held on the outer peripheral wall 53. Accordingly, a printed sheet with a desired ink density can be obtained even when large-volume and continuous printing is conducted. Incidentally, the ink leakage preventing groove 72 may be arranged as the second embodiment.

Figure 17A:
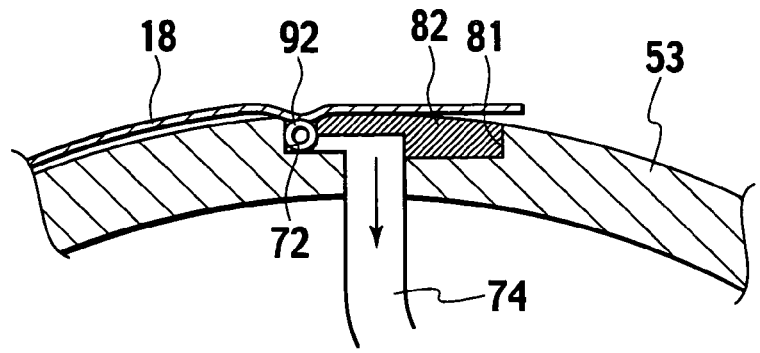
FIGS. 17A to 17C show a modification of the ink leakage preventing groove.
Figure 17B:
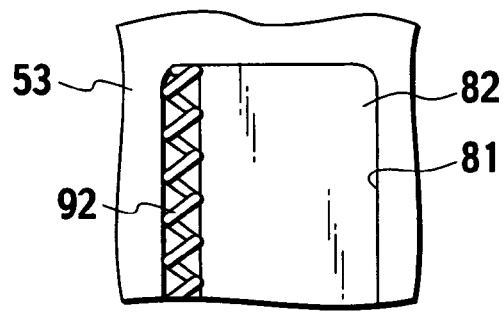
Figure 17C:
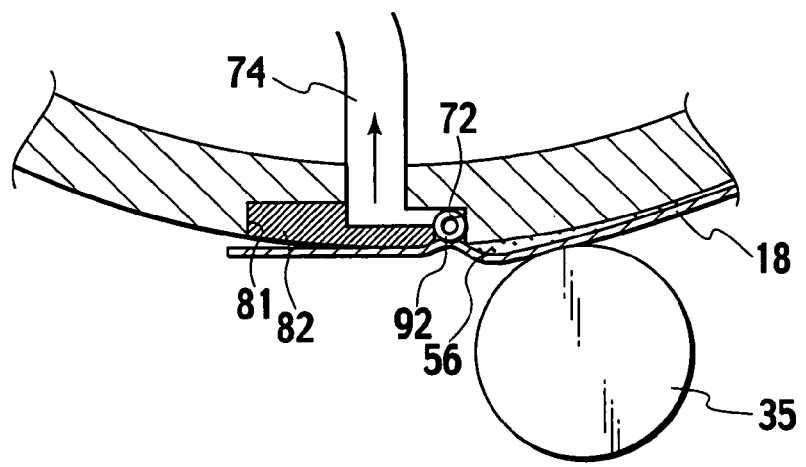

FIGS. 17A to 17C show a modification of the ink leakage preventing groove. FIG. 17A is a cross-sectional view of the vicinity of the ink leakage preventing groove; FIG. 17B is a plan view partially showing the vicinity of the ink leakage preventing groove; and FIG. 17C is a cross-sectional view explaining behavior of the stencil sheet.

As shown in FIGS. 17A and 17B, it is preferable that a spiral ring member 92, serving as a depression preventing member, is fixed inside the ink leakage preventing groove 72. Concretely, the spiral ring member 92 is secured to the ink leakage preventing groove 72 by forcing the spiral ring member 92 into the ink leakage preventing groove 72 by means of its elasticity. The top surface height of the spiral ring member 92 is set to be the same as or slightly lower than the surface of the outer peripheral wall 53. Since the rest of the construction is the same, the same constituents are designated by the same reference numerals, and the detailed description thereof is omitted.

In this modification, as shown in FIG. 17A, the stencil sheet 18 is not depressed into the link leakage preventing groove 72 by the suction power of the ink recovery device. Accordingly, a reduction in recovery efficiency owing to blockage of the ink recovery passage of the ink leakage preventing groove 72 by the stencil sheet 18 can be prevented. Further, as shown in FIG. 17C, the stencil sheet 18 does not stick to the edge of the ink leakage preventing groove 72 and thus does not seal the ink at the sticking position. Therefore, the ink smoothly flows into the ink leakage preventing groove 72 by being squeezed by the pressure roller 35, and thereby the ink does not leak from the end of the outer peripheral wall 53. Furthermore, since the pressure roller 35 is not depressed into the ink leakage preventing groove 72 when passing over the ink leakage preventing groove 72, occurrences of depression noise and vibration of the pressure roller 35 can be prevented.

Figure 18:
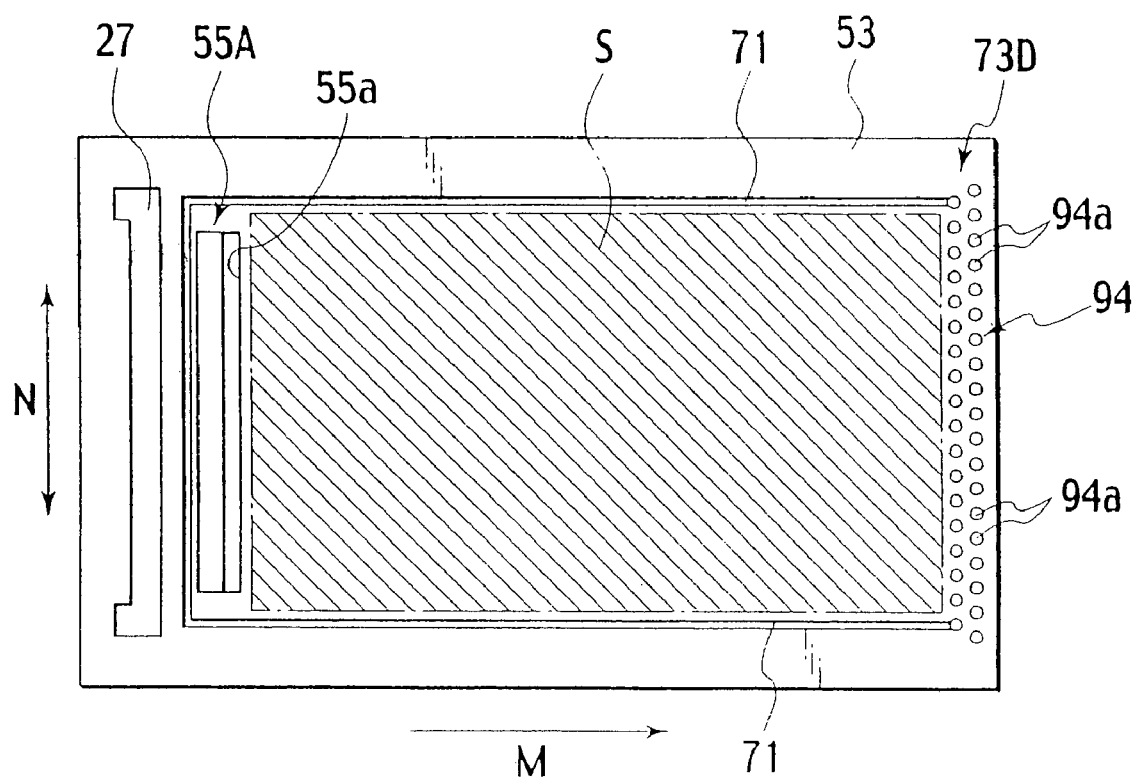
FIG. 18 shows a forth embodiment of the stencil printing machine and is a schematic view of an exploded outer peripheral wall of a drum.

FIG. 18 shows a forth embodiment and is a schematic view of the exploded outer peripheral wall of the drum. As shown in FIG. 18, in this embodiment, an ink recovery device 73D has an ink recovery groove 94 at a printing position downstream of the maximum printing area S of the outer peripheral wall 53 of the drum, and is constructed so as to recover the ink stored in the ink leakage preventing groove 94. Specifically, the ink flown outside and downstream of the maximum printing area S is recovered using the ink recovery groove 94, instead of recovering the ink flown outside of the maximum printing area S using the ink leakage preventing groove 72.

Like this way, it is possible to provide the ink recovery groove 94 instead of the ink leakage preventing groove 72 at the same position. The ink recovery groove 94 includes multiple opening portions 94a formed in two rows in the printing direction M and at an interval in the printing perpendicular direction N.

In the forth embodiment, the ink flown out downstream in the printing direction by being squeezed by the pressure roller is removed from the outer peripheral wall 53 of the drum, and recycling of the ink can be realized.

Further, the stencil sheet 18 is not depressed into the link recovery groove 94 by the suction power of the ink recovery device 73D. Accordingly, a reduction in recovery efficiency owing to blockage of the ink recovery passage of the ink recovery groove 94 by the stencil sheet 18 can be prevented. Further, the stencil sheet 18 does not stick to the edge of the ink recovery groove 94 and thus does not seal the ink at the sticking position. Therefore, the ink smoothly flows into the ink recovery groove 94 by being squeezed by the pressure roller, and thereby the ink does not leak from the end of the outer peripheral wall 53. Furthermore, since the pressure roller is not depressed into the ink recovery groove 94 when passing over the ink recovery groove 94, depression noise and vibration of the pressure roller 35 can be prevented.

In a fifth embodiment, this stencil printing machine has ink volume adjusting means for controlling the ink supply volume from the ink supply unit in a direction perpendicular to the printing direction, and it is preferable to control this ink volume adjusting means according to the perforation percentage of the stencil sheet. It is possible thereby to increase the ink supply volume in an area with a high perforation percentage and decrease the volume of ink supplied in an area with a low perforation percentage, thus supplying only a required volume of ink to a required area, and as far as possible preventing excessive ink from being supplied. That is, the ink can be spread with good efficiency.

Moreover, it is preferable to provide ink volume adjusting means for controlling the ink supply volume from the ink supply unit in a direction perpendicular to the printing direction, and to control the ink volume adjusting means according to the size of a print medium that is fed. It is thereby possible to supply the ink in an area where the print medium is present and supply no ink in an area where no print medium is present, thus supplying the ink only to a required area, and as far as possible preventing excessive ink from being supplied. That is, the ink can be spread with good efficiency.

Figure 19:
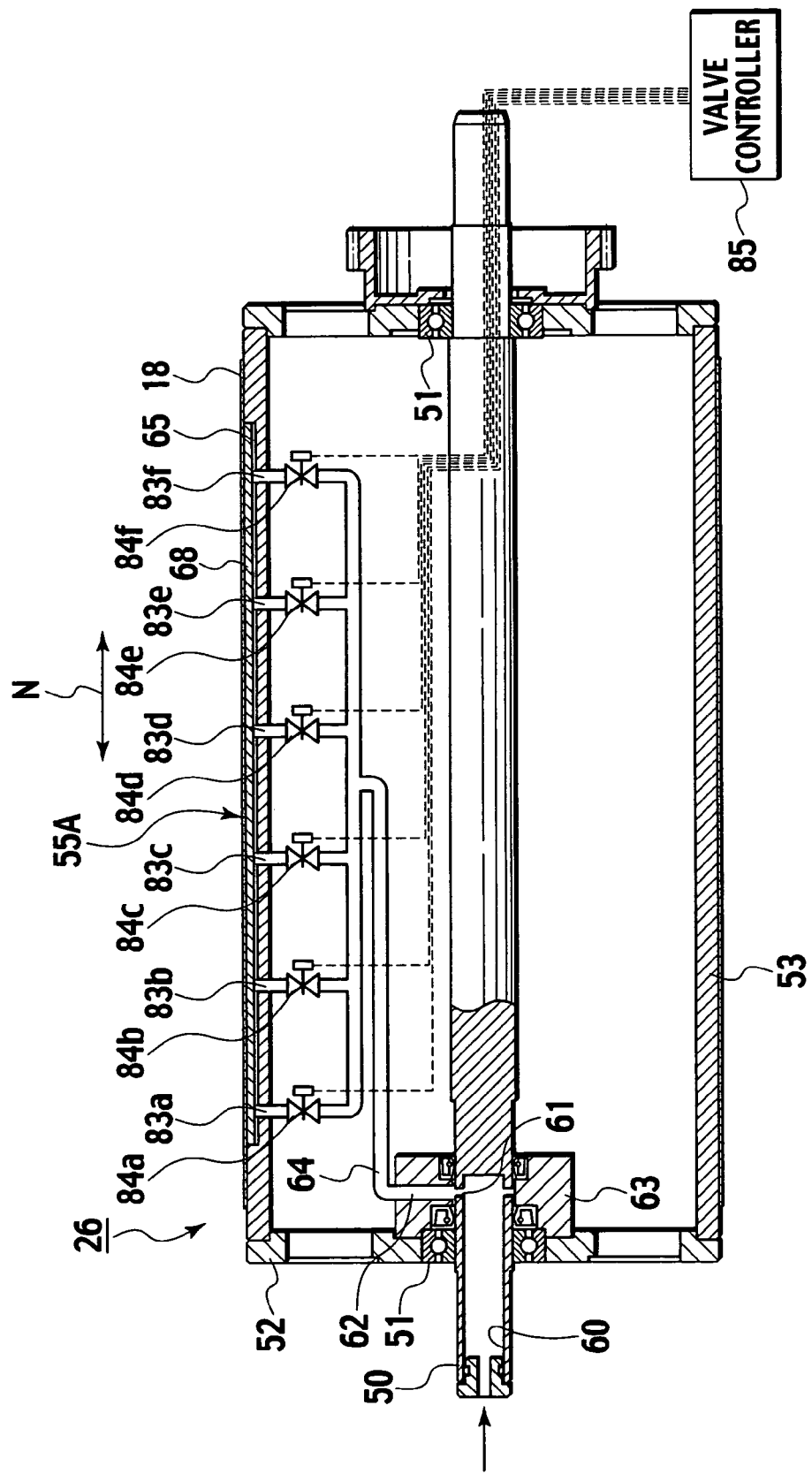
FIG. 19 shows a fifth embodiment of the stencil printing machine and is a cross-sectional view of a drum.
Figure 20:
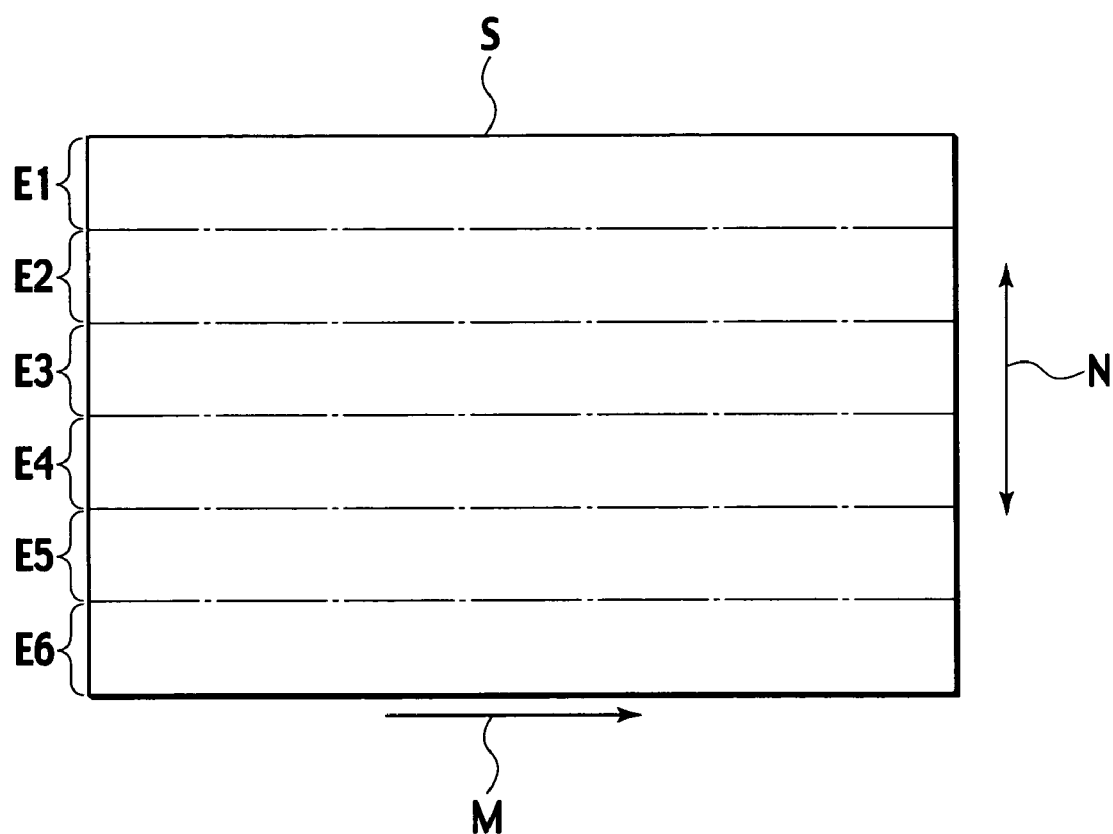
FIG. 20 shows the fifth embodiment of the stencil printing machine and an explanatory view showing a maximum printing area divided into six areas.
Figure 21:
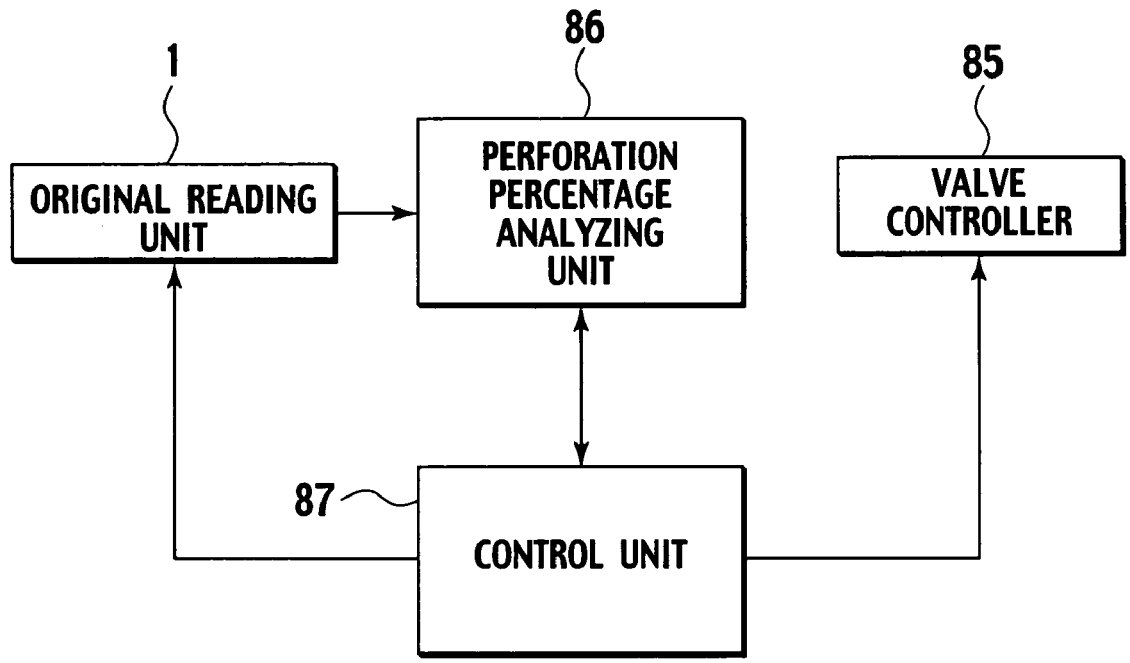
FIG. 21 shows the fifth embodiment of the stencil printing machine and is a control block diagram.

FIGS. 19 to 21 show the fifth embodiment. FIG. 19 is a cross-sectional view of the drum; FIG. 20 is an explanatory view showing the maximum printing area divided into six areas; and FIG. 21 is a control block diagram.

As shown in FIG. 19, in the fifth embodiment, the ink supply to the ink supply unit 55A is carried out through ink supply passages 83*a* to 83*f* arranged at an equal interval in the printing perpendicular direction N. Control valves 84*a* to 84*f*, each of which controls an ink flow volume, are attached to these ink supply passages 83*a* to 83*f*, respectively. When the maximum printing area of the outer peripheral wall 53 is divided into six areas in the printing perpendicular direction N, six of these ink supply passages 83*a* to 83*f* and the control valves 84*a* to 84*f* are arranged at the upstream positions of the divided areas, and each of them are almost in charge of ink supply for each of the divided areas E1 to E6 (shown in FIG. 20). Specifically, six of the control valves 84*a* to 84*f* construct ink volume adjusting means which controls ink supply from the ink supply unit 55A in the printing perpendicular direction N. Opening/closure of the control valves 84*a* to 84*f* are respectively controlled by a valve controller 85.

Meanwhile, as shown in FIG. 21, the fifth embodiment has a perforation percentage analyzing unit 86 which detects a perforation percentage in each of the divided areas E1 to E6 based on the image data form the original reading unit 1. A control unit 87 outputs an instruction to the valve controller 85 for the opening/closure state in accordance with the perforation percentage. To be specific, the control unit 87 sends the instruction to open the valve more widely with a high perforation percentage, and to open the valve less widely with a low perforation percentage. Note that the rest of the construction is the same as that of the first embodiment. Therefore, the same constituents are designated by the same reference numerals, and detailed description thereof is omitted.

In the fifth embodiment, similarly to the first embodiment, the ink 56 does not deteriorate even when printing is not carried out for a long time. Further, the small and light-weighted drum 26 can be realized.

Furthermore, the fifth embodiment has the plurality of control valves 84*a* to 84*f* which can control ink supply volume from the ink supply unit 55A in the printing perpendicular direction N, and each of the control valves 84*a* to 84*f* are controlled in accordance with the perforation percentage of the stencil sheet 18. Therefore, the ink supply volume is increased for an area with a high perforation percentage and decreased for an area with a low perforation percentage, thus supplying only a required volume of ink 56 to a required area. Thus, excessive ink supply can be prevented as soon as possible. Specifically, efficient ink diffusion can be carried out, and probability of ink leakage can be reduced.

Figure 22:
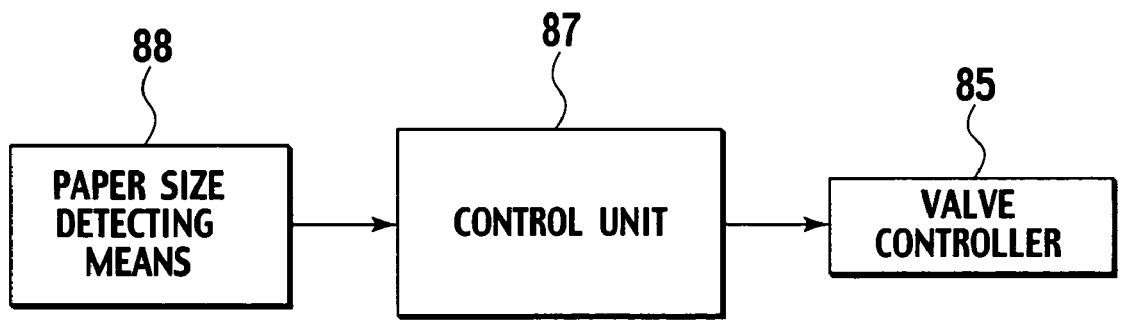
FIG. 22 is the control block diagram showing a modification of the fifth embodiment.

FIG. 22 is a control block diagram showing a modification of the fifth embodiment.

In this modification, paper size detecting means 88 is provided, which detects a paper size (paper width) of the print paper set on the paper feed tray. The control unit 87 outputs an instruction to the valve controller 85 for the opening/closure state in accordance with a detection result (paper size) from the paper size detecting means 88. To be specific, the control unit 87 sends the instruction to open the control valve in the divided area where the print paper is present and to close the control valve in the divided area where the print paper is not present. Since the rest of the construction is the same as the fifth embodiment, detailed description thereof is omitted.

In this modification, the plurality of control valves are provided, which can control the ink supply volume from the ink supply unit in the printing perpendicular direction, and each of the control valves are controlled in accordance with a size of the print paper to be fed. Therefore, the ink 56 is supplied to the area where the print paper is present and is not supplied to the area where the print paper is not present. Thus, the ink 56 can be supplied only to required areas, and the excessive ink supply can be prevented as soon as possible. Specifically, efficient ink diffusion can be carried out, and probability of ink leakage can be reduced. Incidentally, the control in accordance with a perforation percentage of the fifth embodiment and the control in accordance with a sheet size of the modification of the fifth embodiment can be performed together.

In a sixth embodiment, this stencil printing machine preferably has the ink supply means and the ink recovery means always driven when in the printing mode. Since the ink is thereby continuously supplied to the outer peripheral wall by the ink supply unit when in the printing mode and the ink entering the ink leakage preventing groove from the outer peripheral wall is always recovered, it is possible to prevent the ink from building up on the outer peripheral wall. Furthermore, since an appropriate volume of ink can always be held on the outer peripheral wall, even when large scale continuous printing is carried out printed material having a desired ink density can be obtained.

In a seventh embodiment, with regard to this stencil printing machine, the width of the pressure roller is preferably set to be the same as the distance between the ink leakage preventing grooves provided at the right and left outer positions perpendicular to the printing direction so that the pressure roller presses down inside the outer edges of the two ink leakage preventing grooves. In this way, since the pressure roller does not press on the ink leakage preventing groove in a sealed state, it is possible to prevent the ink within the ink leakage preventing groove from leaking past the outer side of the ink leakage preventing groove by means of the pressure of the pressure roller. Furthermore, when it is arranged that the ink recovery means recovers the ink within the ink leakage preventing groove by a suction force, since the pressure roller does not press down outside the ink leakage preventing grooves, ink that has leaked past the outer side of the ink leakage preventing groove is not pressed on by the pressure roller, and it is highly possible that the leaked ink will be recovered again into the ink leakage preventing groove by the suction of the ink recovery means.

Figure 23:
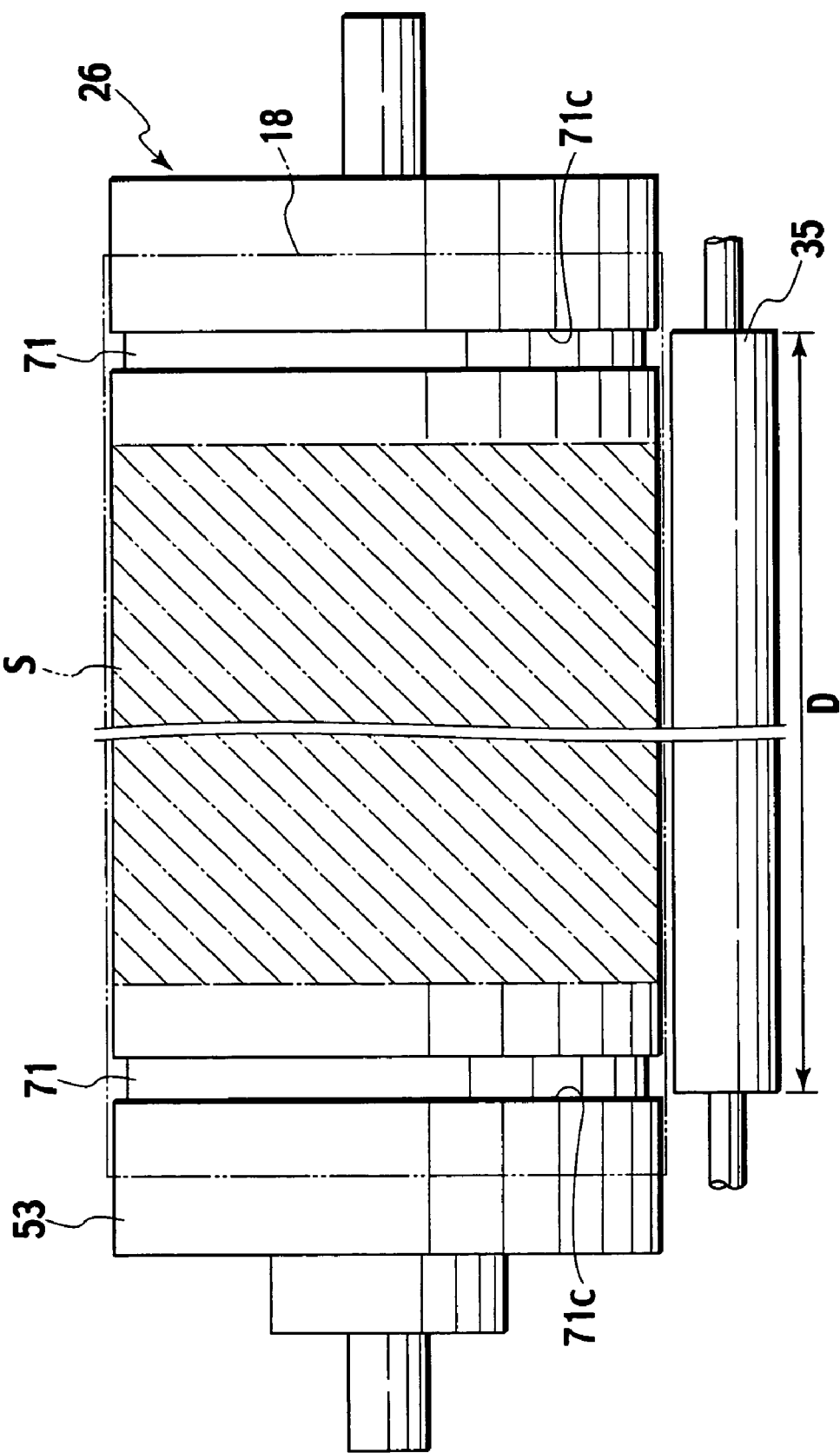
FIG. 23 shows a seventh embodiment of the stencil printing machine and is a front view of a drum and a pressure roller.

FIG. 23 shows the seventh embodiment and is a front view of the drum and the pressure roller. As shown in FIG. 23, in the seventh embodiment, a width D of the pressure roller 35 is set between the ink leakage preventing grooves 71 and 71, respectively provided at the positions on the right and left sides as well as outside of the maximum printing area S in the printing perpendicular direction N, so that the pressure roller 35 presses the inner sides of the respective outer edges 71c of these two ink leakage preventing grooves 71 and 71. Specifically, the width D of the pressure roller 35 is set to a dimension between a width of the maximum printing area S and a width between the outer edges of the ink leakage preventing grooves 71 and 71 on the light and left sides.

In the seventh embodiment, since the pressure roller 35 does not press the ink leakage preventing grooves 71 and 71 over their whole width, the ink in the ink leakage preventing grooves 71 and 71 are prevented from overflowing outside the ink leakage preventing grooves 71 and 71 due to pressing force of the pressure roller 35. In the case where the ink recovery device is constructed to recover the ink in the ink leakage preventing grooves 71 and 71 by suction power, the pressure roller 35 does not press outside of the ink leakage preventing grooves 71 and 71. Thus, the ink leaking outside of the ink leakage preventing grooves 71 and 71 are not pressed by the pressure roller 35, and thereby the leaking ink is more likely to be recovered into the ink leakage preventing grooves 71 and 71 again by the suction of the ink recovery device.

The stencil printing method according to the present invention is carried out by employing the above-mentioned stencil printing machine, and comprises a step of mounting a stencil sheet on the drum, a step of plate-making the stencil sheet, and a step of transferring a water-based ink to a print medium by making the water-based ink pass through perforations of the stencil sheet. Details of each step are as described in the above-mentioned explanation of the stencil printing machine.

Next, a water-based ink (hereinafter simply called 'ink') for use in the stencil printing method according to the present invention and an ink according to the present invention will be explained.

The ink typically contains water, a coloring agent, and a water-soluble organic solvent.

It is preferable for water to be contained in the ink at 50 wt % or more from the viewpoint of enhancement of the drying properties of the printed material, and control of the thread-forming length and viscosity of the ink, and more preferably for it to be contained 65 wt % or more. The upper limit of the amount of water added is not particularly restricted; it may be determined appropriately while taking into consideration the balance with other components added, and is preferably, for example, about 80 wt % or less.

The above-mentioned stencil printing machine is suitably used with a water-based ink having a high water content since the ink within the printing machine is sealed and the water is thus prevented from evaporating into the atmosphere.

With regard to the coloring agent of the ink, a pigment or a dye may be used, and two or more types thereof may be used in combination. Examples of the pigment include azo-based, phthalocyanine-based, dye-based, fused ring-based, nitro-based, and nitroso-based organic pigments (Brilliant Carmine 6B, Lake Red C, Watchung Red, Disazo Yellow, Hansa Yellow, Phthalocyanine Blue, Phthalocyanine Green, Alkali Blue, Aniline Black, etc.); inorganic pigments such as metals, metal oxides, and sulfides of cobalt, iron, chromium, copper, zinc, lead, titanium, vanadium, manganese, nickel, etc., yellow ochre, ultramarine, and Prussian blue; and carbon blacks such as furnace carbon black, lamp black, acetylene black, and channel black. Examples of the dye include water-soluble dyes and water-soluble dyes that become water-soluble by reduction, etc., selected from basic dyes, acid dyes, direct dyes, soluble vat dyes, acid mordant dyes, mordant dyes, reactive dyes, vat dyes, sulfide dyes, etc. Either of the pigment or the dye, or both thereof, may be used as the coloring agent, but it is preferable to use the pigment since ink spreading or print-through in an image is suppressed and an ink having excellent weatherability can be obtained.

The content of the coloring agent in the ink is usually 1 to 20 wt %, and preferably 3 to 15 wt %. In order to further increase the print density of the printed material, it is preferable for the content to be 5 wt % or greater.

It is preferable for the ink to contain a water-soluble organic solvent from the viewpoint of prevention of drying in perforations of the stencil sheet during printing.

As the water-soluble organic solvent, an organic compound that is a liquid at room temperature and can be dissolved in water is used. Examples thereof include lower alcohols such as methanol, ethanol, 1-propanol, isopropanol, 1-butanol, 2-butanol, isobutanol, and 2-methyl-2-propanol; glycols such as ethylene glycol, diethylene glycol, triethylene glycol, tetraethylene glycol, pentaethylene glycol, propylene glycol, dipropylene glycol, and tripropylene glycol; glycerol; acetins (monoacetin, diacetin, triacetin); glycol derivatives such as triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; triethanolamine, 1-methyl-2-pyrrolidone, β-thiodiglycol, and sulfolane. It is also possible to use a low molecular weight polyalkylene glycol such as a polyethylene glycol having an average molecular weight in the range of 190 to 630, for example, an average molecular weight of 200, 300, 400, or 600, a diol type polypropylene glycol having an average molecular weight in the range of 200 to 600, for example, an average molecular weight of 400, or a triol type polypropylene glycol having an average molecular weight in the range of 250 to 800, for example, an average molecular weight of 300 or 700. These water-soluble organic solvents may be used singly or in a combination of two or more types.

The content of the water-soluble organic solvent in the ink, as a total content when two or more types are used, is preferably 5 wt % or more, and more preferably 10 wt % or more. The upper limit of the content is not particularly restricted, but in order to suppress print-through of the image, it is preferably about 45 wt % or less, and more preferably about 35 wt % or less. It is preferable to add to the ink 5 wt % or more of a water-soluble organic solvent having a boiling point higher than that of water, and more preferably a boiling point of 150° C. or higher, since drying in the perforations of the stencil sheet during printing can be prevented effectively.

In the above-mentioned stencil printing machine, unlike a conventional machine, it is unnecessary to set the viscosity of the ink at a relatively high value in order to ensure that it matches a printing machine so that, for example, the ink is prevented from leaking from the printing machine.

Accordingly, the viscosity of the ink is preferably lower than that of conventional commercial inks. Specifically, the ink viscosity at a shear stress of 10 Pa when the shear stress is increased from 0 Pa at a speed of 1 Pa/s is preferably 500 mPa·s or less at 23° C., more preferably 300 mPa·s or less, and particularly preferably 100 mPa·s or less. The ink viscosity measured in the same manner is preferably 1.5 mPa·s or greater, more preferably 3.0 mPa·s or greater, and yet more preferably 5.0 mPa.s or greater.

If the viscosity of the ink is high, it is necessary to set the pressing force of the pressure roller at a high value, and if this value is too high, there is a possibility that the volume of ink transferred might increase, or expansion or contraction of an image might occur due to elongation of the stencil sheet, but by decreasing the viscosity of the ink as mentioned above it is possible to prevent these problems from being caused, the supply of ink in the above-mentioned stencil printing machine is optimized, there are no image defects at the edges on the printed surface, and the speed of penetration of the ink into the print medium can be improved, thus enabling the drying properties of the printed material to be enhanced easily.

The ink preferably has the thread-forming properties. Specifically, the ink thread-forming length when a 15 mm diameter chrome steel ball is pulled out of the ink at 150 mm/s is preferably 30 mm or longer at 23° C., more preferably 40 mm or longer, and yet more preferably 50 mm or longer.

In the ink having the long thread-forming length such as above, it is possible to control the volume of ink transferred to a substrate, regardless of the level of viscosity of the ink, that is, even when the ink has low viscosity. Accordingly, it is possible to improve drying properties of the printing material, and to obtain an image of high quality having good sharpness of fine characters and fine lines. Furthermore, it is possible to print an image having a uniform solid printed section.

Figure 24:
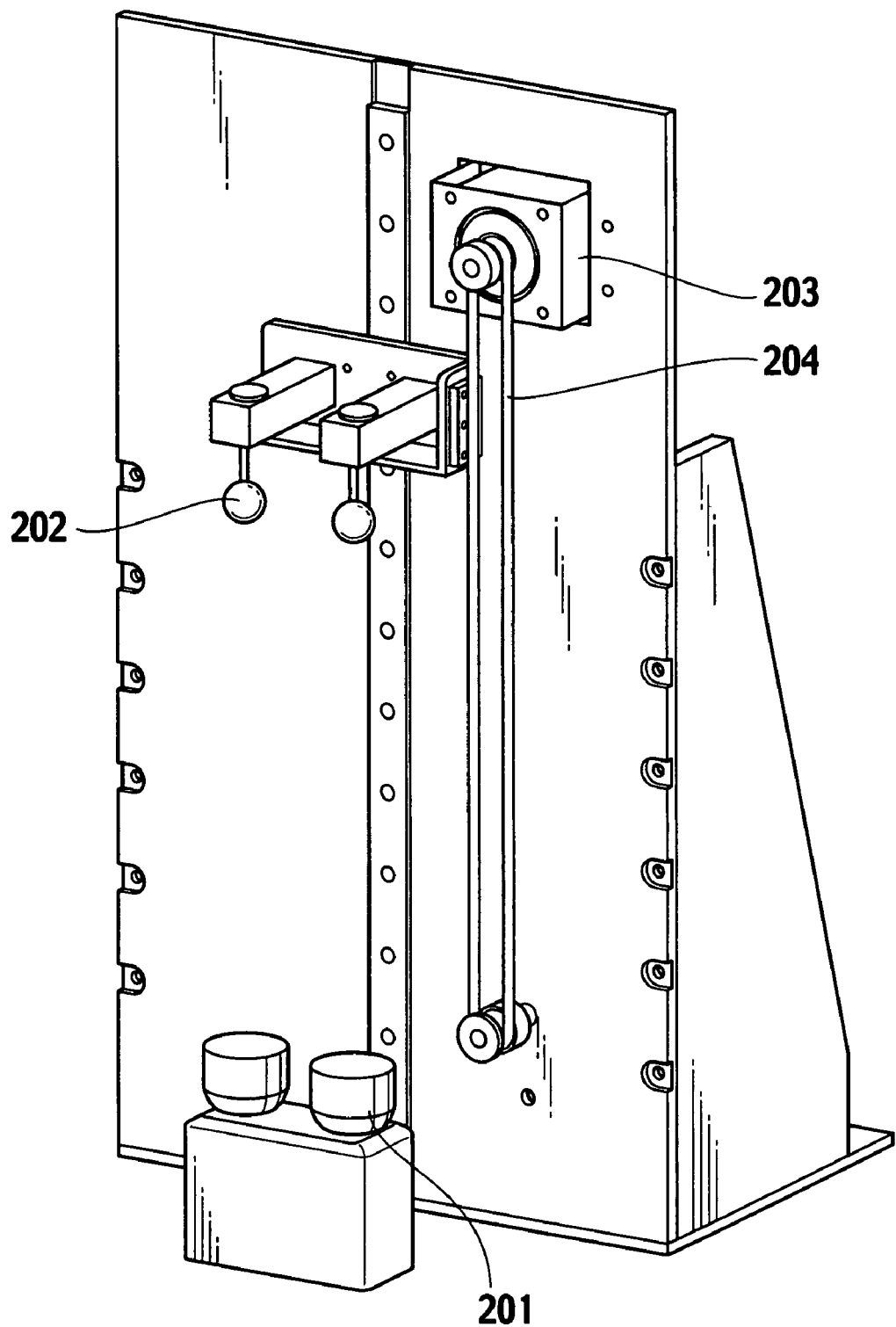
FIG. 24 shows a diagram schematically showing an outline arrangement of an instrument used for measurement of thread-forming length.

Specifically, the thread-forming length can be measured using a measuring instrument shown in FIG. 24. This measuring instrument comprises a container 201 containing an ink, a 15 mm diameter chrome steel ball 202, a stepping motor 203, and a belt 204. The chrome steel ball 202 is fixed to the belt 204, which is rotated by the stepping motor 203, so as to move up and down at a constant speed. The measurement environment is set at 23° C., the whole of the chrome steel ball 202 is immersed in the ink within the container 201 so that the upper part of the ball coincides with the line of the ink liquid surface, and the ball is pulled out vertically at a speed of 150 mm per second. Pictures of this procedure are taken and recorded using photographic equipment (not illustrated) placed in front of the measuring instrument, and the maximum length of the ink thread formed between the ink liquid surface and the steel ball immediately before the ink thread is broken (distance between the ink liquid surface and the lower part of the steel ball) is read off from a recorded image.

The upper limit of the thread-forming length is not particularly restricted, but it is preferably not more than 500 mm, more preferably not more than 250 mm, and yet more preferably not more than 200 mm. When the thread-forming length exceeds 500 mm, the volume of ink transferred is suppressed excessively, fine characters and fine lines, etc. might be partially missing, and if it exceeds 250 mm, when there is a solid printed section in an image, the solid printed section might become uneven. The reason therefor is not clear either, but it is thought that, when the stencil sheet is peeled off from the printing paper, the ink that has been transferred through the perforations of the stencil sheet to the printing paper is attracted to the ink that has not been transferred, thus causing unevenness in the image formed.

The ink preferably contains an agent for imparting thread-forming properties that can impart appropriate thread-forming properties to the ink. Among others, an unbranched, uncrosslinked, straight-chain, unsaturated carboxylic acid-based water-soluble polymer containing a repeating unit represented by formula (I) below is preferably used since the ink thread-forming properties can be controlled appropriately.

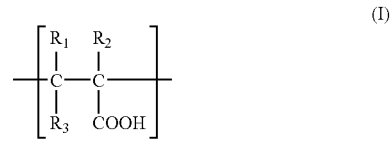

(In the formula, $R_1$, $R_2$, and $R_3$ independently denote H, $CH_3$, or $(CH_2)_n COOH$ (n is an integer of 0 or 1).)

When there are two or more carboxyl groups, they may form an acid anhydride. In the case of a copolymer, the copolymer form may be any of random, alternating, block, graft, etc.

Examples of the unsaturated carboxylic acid-based water-soluble polymer include water-soluble polymers containing in the main chain at least one type of unsaturated carboxylic acid selected from the group consisting of acrylic acid or methacrylic acid (hereinafter, the two are together called '(meth)acrylic acid'), maleic anhydride, maleic acid, fumaric acid, crotonic acid, and itaconic acid; and salts thereof. This unsaturated carboxylic acid-based water-soluble polymer becomes a superpolyvalent ionic polymer having a high quantity of negative charge when dissolved in water, and it is thought that this strong ionic atmosphere generates an effect of imparting thread-forming properties.

Specific examples thereof include poly(meth)acrylic acid, an acrylic acid-methacrylic acid copolymer, a (meth)acrylic acid-maleic acid copolymer, a (meth)acrylic acid-sulfonic acid type monomer copolymer, a (meth)acrylic acid-itaconic acid copolymer, a (meth)acrylate-maleic acid copolymer, a (meth)acrylic acid-(meth)acrylamide copolymer, a (meth)acrylic acid-(meth)acrylate copolymer, a (meth)acrylic acid-vinylpyrrolidone copolymer, polymaleic acid, polyfumaric acid, polycrotonic acid, polyitaconic acid, and a maleic anhydride-alkyl vinyl ether copolymer; and salts thereof With regard to the salts, monovalent metal salts and amine salts are preferable and, for example, in the case of poly (meth)acrylic acid, examples of the salt thereof include poly(sodium (meth)acrylate), poly(potassium (meth)acrylate), poly(ammonium (meth)acrylate), and poly(triethanolamine (meth)acrylate). Other preferred examples thereof include poly(sodium itaconate), poly(sodium maleate), a sodium acrylate-methacrylate copolymer, a sodium acrylate-maleate copolymer, and a sodium acrylate-acrylamide copolymer.

When these unsaturated carboxylic acid-based water-soluble polymers are of an unneutralized type, the ink usually contains, in addition to the water-soluble polymer, an alkaline neutralizing agent such as sodium hydroxide, potassium hydroxide, aqueous ammonia, triethanolamine, or diisopropanolamine. When a neutral salt of an unsaturated carboxylic acid-based water-soluble polymer is used, it is unnecessary to add these alkaline neutralizing agents.

When the unsaturated carboxylic acid-based water-soluble polymer is of a straight-chain structural type, if compared with compounds having the same molecular structure, the larger the weight-average molecular weight, the longer the ink thread-forming length, and the lower the content thereof in the ink, the lower the ink viscosity.

Among the above-mentioned unsaturated carboxylic acid-based water-soluble polymers, since the thread-forming length can be increased without increasing the viscosity of the ink, polymers (homopolymer or copolymer) formed only from an unsaturated carboxylic acid monomer (acrylic acid, methacrylic acid, crotonic acid, itaconic acid, maleic acid, maleic anhydride, fumaric acid) and salts of these polymers are preferably used, and polyacrylic acid and salts thereof are particularly preferably used.

The unsaturated carboxylic acid-based water-soluble polymer such as polyacrylic acid and salts thereof preferably has a weight-average molecular weight of 10,000 or greater, more preferably 100,000 or greater, yet more preferably 600,000 or greater, and particularly preferably 1,200,000 or greater. When the molecular weight is less than 10,000, in order to increase the thread-forming length of the ink, it is necessary to increase the content of the unsaturated carboxylic acid-based water-soluble polymer, and as a result it becomes difficult to reduce the viscosity of the ink. Furthermore, the molecular weight is preferably not more than 10,000,000, and more preferably not more than 6,000,000. When the molecular weight exceeds 10,000,000, although it is possible to increase the thread-forming length of the ink with a low content of the unsaturated carboxylic acid-based water-soluble polymer, in order to obtain a thread-forming length that is not too large, it is necessary to make the content very low, and it becomes difficult to obtain stable physical properties for the ink.

The content of the unsaturated carboxylic acid-based water-soluble polymer in the ink depends on the type thereof, it is typically 0.01 to 5 wt %, preferably 0.05 to 3 wt %, more preferably 0.1 to 1 wt %, and yet more preferably 0.1 to 0.5 wt %. Since the ink thread-forming length might change due to the influence of other ink components, the type and the content of the agent that imparts thread-forming properties are preferably adjusted as appropriate while taking into consideration the influence of other ink components.

The ink may further contain, as an ink viscosity adjusting agent, any viscosity increasing agent and may, for example, contain one or more types from a water-soluble polymer type viscosity increasing agent other than the above-mentioned unsaturated carboxylic acid-based water-soluble polymer, an unsaturated carboxylic acid type viscosity increasing agent other than a straight-chain structure type, and a clay mineral type viscosity increasing agent.

With regard to the water-soluble polymer type viscosity increasing agent, a natural polymer, a semisynthetic polymer, or a synthetic polymer may be used. Examples of the natural polymer include vegetable-based natural polymers such as gum arabic, carrageenan, guar gum, locust bean gum, pectin, tragacanth gum, corn starch, konjac mannan, and agar; microbial-based natural polymers such as pullulan, xanthan gum, and dextrin; and animal-based natural polymers such as gelatin, casein, and animal glue. Examples of the semisynthetic polymer include cellulose-based semisynthetic polymers such as ethylcellulose, carboxymethylcellulose, hydroxyethylcellulose, hydroxypropylcellulose, methylcellulose, and hydroxypropylmethyl cellulose; starch-based semisynthetic polymers such as hydroxyethylstarch, sodium carboxymethylstarch, and cyclodextrin; alginic acid-based semisynthetic polymers such as sodium alginate and propylene glycol alginate; and sodium hyaluronate. Examples of the synthetic polymer include vinyl-based synthetic polymers such as polyvinylpyrrolidone, polyvinylalcohol, poly(vinyl methyl ether), poly(N-vinylacetamide), and polyacrylamide; poly(ethylene oxide), polyethyleneimine, and polyurethane.

With regard to the unsaturated carboxylic acid-based viscosity increasing agent other than the straight-chain structure type, among the above-mentioned unsaturated carboxylic acid-based water-soluble polymers cited as examples, those not of a straight-chain structural type and having, for example, a branched, crosslinked structure by use of a crosslinking agent, can be cited as examples.

Examples of the clay mineral type viscosity increasing agent include smectite type clay minerals such as montmorillonite, hectorite, and saponite.

The water-soluble polymer cited above as an example of the viscosity increasing agent may, depending on the type and amount of the water-soluble polymer, be used as a fixing agent for fixing the coloring agent to the printing paper as well as the ink viscosity increasing agent. It can also be used as a dispersing agent for the pigment when a pigment is used as the coloring agent,.

The ink may contain, in addition to the above-mentioned components, any of a pigment dispersing agent, a fixing agent, an antifoaming agent, a surface tension reducing agent, a pH adjusting agent, an antioxidant, a preservative, etc. as appropriate.

The ink may contain an alkali-soluble resin as a fixing agent for fixing the coloring agent to the substrate such as a printing paper. When a pigment is used as the coloring agent, an alkali-soluble resin may also be used as the dispersing agent for the pigment. The alkali-soluble resin referred to here means a polymer that is insoluble in water but becomes water-soluble in the presence of an alkali. Even when the compound name is the same, for example, an acrylic acid-acrylate copolymer, in the present invention it is classified as a water-soluble polymer or an alkali-soluble resin depending on the solubility.

Examples of the alkali-soluble resin include a styrene-(meth)acrylic acid copolymer, a styrene-α-methylstyrene-(meth)acrylic acid copolymer, a styrene-(meth)acrylate-(meth)acrylic acid copolymer, a styrene-maleic anhydride copolymer, a vinylnaphthalene-(meth)acrylic acid copolymer, a vinylnaphthalene-maleic acid copolymer, an isobutylene-maleic anhydride copolymer, a (meth)acrylate-(meth)acrylic acid copolymer, and an acrylate-methacrylate-(meth) acrylic acid copolymer. They may be used singly or in a combination of two or more types. These alkali-soluble resins may be neutralized with any alkali, for example, an alkali metal hydroxide such as sodium hydroxide or potassium hydroxide, aqueous ammonia, or an alkanolamine such as triethanolamine, to impart water-solubility thereto.

When a large amount of alkali-soluble resin is added, there is a possibility that the printing performance of a printing machine after a nonoperating period might be degraded, and it is therefore preferably contained at 5 wt % or less on a solids content basis, and more preferably 3 wt % or less.

The ink may contain an oil-in-water (O/W) type resin emulsion as the fixing agent for fixing the coloring agent to the substrate such as a printing paper. When a pigment is used as the coloring agent, this resin emulsion may be used as a dispersing agent for the pigment.

Examples of the oil-in-water (O/W) type resin emulsion include resin emulsions such as poly(vinyl acetate), an ethylene-vinyl acetate copolymer, a vinyl acetate-acrylate copolymer, polyacrylate, polymethacrylate, polystyrene, a styrene-acrylate copolymer, a styrene-butadiene copolymer, a vinylidene chloride-acrylate copolymer, poly(vinyl chloride), a vinyl chloride-vinyl acetate copolymer, and polyurethane. They may be used in a combination of two or more types.

When a large amount of resin emulsion is added, there is a possibility that the printing performance of a printing machine after a nonoperating period might be degraded, and it is therefore preferably contained in the ink at 5 wt % or less on a solids content basis, and more preferably 2 wt % or less.

In order to improve the image quality of printed material, the ink may contain a body pigment.

Examples of the body pigment include white earth, talc, clay, diatomaceous earth, calcium carbonate, barium carbonate, barium sulfate, alumina white, silica, kaolin, mica, and aluminum hydroxide. They may be used in a combination of two or more types.

When a large amount of body pigment is added, there is a possibility that the fixing of the coloring agent to the substrate might be hindered and the printing performance of a printing machine after a nonoperating period might be degraded, and it is therefore preferably contained in the ink at 5 wt % or less, and more preferably 2 wt % or less.

Furthermore, as the pigment dispersing agent, the antifoaming agent, the surface tension reducing agent, etc., the ink may contain an anionic surfactant, a cationic surfactant, an amphoteric surfactant, or a nonionic surfactant, or a polymer-based, silicone-based, or fluorine-based surfactant.

In order to adjust the viscosity or pH of the ink, the ink may contain an electrolyte. Examples of the electrolyte include sodium sulfate, potassium hydrogen phosphate, sodium citrate, potassium tartarate, and sodium borate, and they may be used in a combination of two or more types. It is also possible to use, as the ink viscosity increasing adjuvant or the pH adjusting agent, sulfuric acid, nitric acid, acetic acid, sodium hydroxide, potassium hydroxide, ammonium hydroxide, triethanolamine, etc.

By adding an antioxidant, oxidation of ink components can be prevented, and the storage stability of the ink can be improved. Examples of the antioxidant include L-ascorbic acid, sodium L-ascorbate, sodium isoascorbate, potassium sulfite, sodium sulfite, sodium thiosulfate, sodium dithionite, and sodium pyrosulfite.

By adding a preservative, it is possible to prevent the ink from decomposing, thus improving the storage stability. Examples of the preservative include isothiazolone-based preservatives such as 5-chloro-2-methyl-4-isothiazolin-3-one, 2-methyl-4-isothiazolin-3-one, 2-n-octyl-4-isothiazolin-3-one, and 1,2-benzoisothiazolin-3-one; triazine-based preservatives such as hexahydro-1,3,5-tris(2-hydroxyethyl)-s-triazine; pyridine/quinoline-based preservatives such as sodium 2-pyridinethiol-1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol, and 1,2-dibromo-2,4-dicyanobutane; methyl p-hydroxybenzoate, ethyl p-hydroxybenzoate, potassium sorbate, sodium dehydroacetate, and salicylic acid.

The ink can be produced by mixing water, a water-soluble organic solvent and a coloring agent, and other components above listed which may be contained if necessary. The details thereof are not particularly limited. For example, part of the water, a pigment, and a pigment dispersing agent may be mixed and the pigment may be dispersed using dispersing means such as a ball mill or a bead mill; separately, the rest of water, an unsaturated straight-chain carboxylic acid-based water-soluble polymer, and a water-soluble organic solvent may be mixed, and the two mixtures may be combined.

In the stencil printing machine employed in the stencil printing method of the present invention, when the print medium is fed while the outer peripheral wall of the drum is rotated and ink is supplied on the surface of the outer peripheral wall from the ink supply unit, the print medium is conveyed while being pressed by the pressure roller onto the stencil sheet and the outer peripheral wall of the drum. Meanwhile, the ink between the outer peripheral wall of the drum and the stencil sheet is diffused downstream of a printing direction while being squeezed by the pressing force of the pressure roller. At the same time, the diffused ink oozes from perforations of the stencil sheet and is transferred on the print medium, thus an ink image is printed on the print medium.

That is, the ink is supplied by being squeezed by the pressure roller between the surface of the drum and the stencil sheet. The ink that has been supplied to the drum is retained in a substantially sealed space between the outer peripheral wall of the drum and the stencil sheet, and contact with the atmosphere can be minimized.

In accordance with the stencil printing method of the present invention employing the above stencil printing machine and water-based ink, the ink does not deteriorate even when printing is not carried out for a long period of time, the water contained in the ink does not evaporate, and as a result high quality printed material having excellent drying properties and causing no smudging of the image even when handled immediately after printing can be provided. Furthermore, even after the printing machine has been allowed to stand for a long period of time in a nonoperating state, printing can be resumed without requiring an operation such as washing, and the same printing performance as that of the printed material prior to the machine being left standing can be obtained for the initial printed material after the nonoperating state.

EXAMPLES

The present invention is explained further in detail below by way of Examples, but the present invention is not limited thereby. In the explanation below, 'wt %' is expressed simply as '%'.

Example 1

5.0% of carbon black ('#40' manufactured by Mitsubishi Chemical Corporation) as a coloring agent, 1.0% of polyvinylpyrrolidone ('K17' manufactured by Dai-ichi Kogyo Seiyaku Co., Ltd.) as a pigment dispersing agent, and 14.0% of distilled water were mixed and dispersed thoroughly by means of a bead mill to give 20.0% of a pigment dispersion. Separately, while stirring 19.9% of distilled water, 0.1% of a straight-chain sodium polyacrylate (1) ('Aronvis S': molecular weight 4,000,000 to 5,000,000, manufactured by Nihon Junyaku Co., Ltd) was gradually added thereto and dissolved. 20.0% of the aqueous straight-chain sodium polyacrylate solution thus obtained, 20.0% of the pigment dispersion, 15.0% of polyethylene glycol ('polyethylene glycol #200' manufactured by Wako Pure Chemical Industries, Ltd.) as a water-soluble organic solvent, and the balance (45.0%) of distilled water were mixed to give an ink of Example 1.

Examples 2 to 9

The procedure of Example 1 was repeated except that the compositions were changed as shown in Table 1 to give inks of Examples. Details of the components in the table are as follows.

Direct dye: 'Daiwa IJ Blue 319H' manufactured by Daiwa Dyestuff Mfg. Co., Ltd.

Straight-chain sodium polyacrylate (2): 'Aronvis M' (molecular weight 2,000,000 to 3,000,000) manufactured by Nihon Junyaku Co., Ltd.

Straight-chain polyacrylic acid: 'Jurymer AC-10H' (molecular weight about 150,000, 20% aqueous solution; the content in Table 1 is expressed on a solids content basis) manufactured by Nihon Junyaku Co., Ltd.

Straight-chain acrylic acid-methacrylic acid copolymer: 'Jurymer AC-20H' (molecular weight about 50,000 to 80,000, 20% aqueous solution; the content in Table 1 is expressed on a solids content basis) manufactured by Nihon Junyaku Co., Ltd.

Sodium carboxymethylcellulose: manufactured by Kanto Kagaku

Printing was carried out on printing paper ('Riso paper thin type' manufactured by Riso Kagaku Corporation) using the inks prepared in the Examples above in a stencil printing machine (a prototype manufactured by Riso Kagaku Corporation) shown in FIGS. 1 to 7; and the printed materials thus obtained were evaluated in terms of image properties (sharpness of fine characters, uniformity of solid printed surface), drying properties, and printing performance at the edges of the printed surface.

The image properties were evaluated visually as the sharpness of fine characters; when fine characters (6 points) were sufficiently legible the rating was A, when reading was difficult it was B, and when fine characters were illegible it was C.

The uniformity of a solid printed surface was expressed as follows: a uniform solid printed surface was rated A, an almost uniform solid printed surface was B, and a solid printed surface that did not give the impression of being uniform was C.

The drying properties of the printed material were evaluated by means of staining of a finger when the image was touched; when there was no staining of the finger three seconds after printing it was rated A, when there was no staining of the finger five seconds after printing it was B, and when there was stain on the finger even five seconds after printing it was C.

The printing performance at the edges of the printed surface was evaluated; when an image could be printed on the left and right rear edges of a printing paper it was rated A, when printing could be carried out but there was slight fading it was B, and when printing could not be carried out it was C.

Figure 25A:
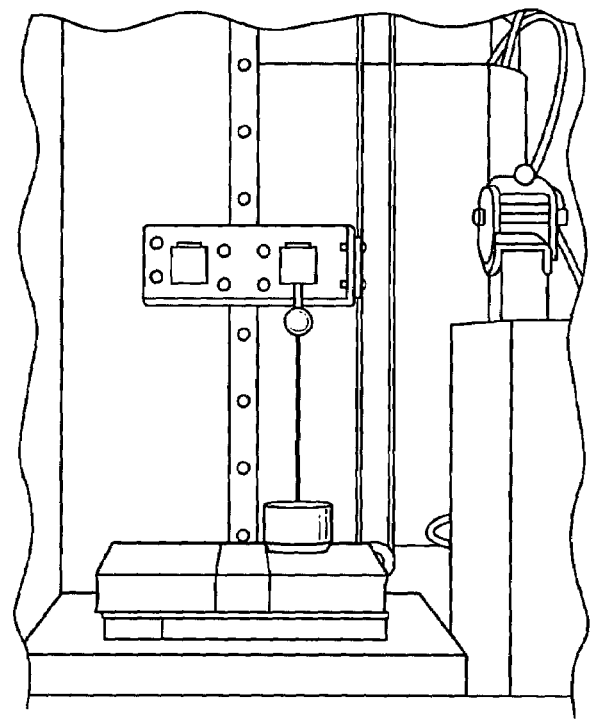
FIGS. 25A and 25B show examples of ink thread-forming properties actually observed.
Figure 25B:
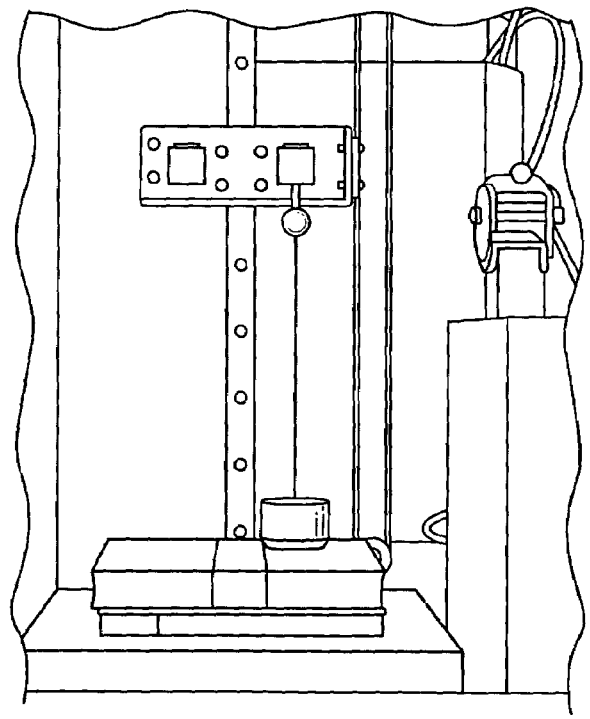

The thread-forming length of the ink was measured using a measuring instrument similar to one whose outline is shown schematically in FIG. 24. That is, in a 23° C. environment, the container 201 was filled with an ink, and the whole of the chrome steel ball 202 (diameter 15 mm) was immersed in the ink so that the upper part of the ball coincided with the line of the ink liquid surface, and the chrome steel ball was subsequently pulled out vertically at a speed of 150 mm per second, pictures of this procedure were taken and recorded using photographic equipment (3CCD color videocamera module XC-003, manufactured by Sony Corporation) (not illustrated), and the maximum length of the ink thread formed between the ink liquid surface and the steel ball immediately before the ink thread was broken (distance between the ink liquid surface and a lower part of the steel ball) was read off from a recorded image. FIG. 25 shows a part of the image recorded in Example 1, FIG. 25A shows an image when the distance between the ink liquid surface and the lower part of the steel ball was 100 mm, and FIG. 25B shows an image when the distance between the ink liquid surface and the lower part of the steel ball was 165 mm, where the thread length of the ink was the maximum.

The viscosity of the ink was measured using a stress controlled rheometer RS75 (cone angle 1°, diameter 60 mm) manufactured by Haake.

The results are given in Table 1.

TABLE 1

| | | Example | | | | | | | | |
|---|---|---|---|---|---|---|---|---|---|---|
| | | 1 | 2 | 3 | 4 | 5 | 6 | 7 | 8 | 9 |
| | | Amount added/wt % | | | | | | | | |
| Coloring agent | Furnace carbon black | 5.0 | 5.0 | 5.0 | 5.0 | 5.0 | 10.0 | — | — | — |
| | Direct dye | — | — | — | — | — | — | 5.0 | 5.0 | 10.0 |
| Pigment dispersing agent | Polyvinylpyrrolidone | 1.0 | 1.0 | 1.0 | 1.0 | 1.0 | 2.0 | — | — | — |
| Water | Distilled water | 78.9 | 78.7 | 78.8 | 76.0 | 71.5 | 62.9 | 79.94 | 78.44 | 89.6 |
| Water-soluble organic solvent | Polyethylene glycol | 15.0 | 15.0 | 15.0 | 15.0 | 15.0 | 25.0 | 15.0 | 15.0 | — |
| Agent for imparting thread-forming properties | Straight-chain poly(sodium acrylate) (1) | 0.1 | 0.3 | — | — | — | 0.1 | 0.06 | 0.06 | — |
| | Straight-chain poly(sodium acrylate) (2) | — | — | 0.2 | — | — | — | — | — | 0.4 |

TABLE 1-continued

| | | Example | | | | | | | | |
|---|---|---|---|---|---|---|---|---|---|---|
| | | 1 | 2 | 3 | 4 | 5 | 6 | 7 | 8 | 9 |
| | | | | | Amount added/wt % | | | | | |
| | Straight-chain polyacrylic acid | — | — | — | 1.0 | — | — | — | — | — |
| | Straight-chain acrylic acid/methacrylic acid copolymer | — | — | — | — | 5.0 | — | — | — | — |
| Viscosity adjusting agent | Sodium carboxymethylcellulose | — | — | — | — | — | — | — | 1.5 | — |
| pH adjusting agent | Triethanolamine | — | — | — | 2.0 | — | — | — | — | — |
| | Sodium hydroxide | — | — | — | — | 2.5 | — | — | — | — |
| Physical properties | Thread-forming length (mm) | 165 | 270 | 120 | 45 | 35 | 165 | 60 | 60 | 85 |
| | Viscosity (mPa · s) | 31 | 247 | 58 | 293 | 340 | 73 | 4.6 | 60 | 13 |
| Results | Sharpness of fine characters | A | A | A | A | A | A | A | A | A |
| | Uniformity of solid printed surface | A | B | A | A | A | A | A | A | A |
| | Drying properties of printed material | A | A | A | B | B | B | A | A | A |
| | Printing properties at edges of printed surface | A | A | A | A | B | A | A | A | A |

As is clear from the table above, printed materials having good sharpness of fine characters, good drying properties of the printed material, etc. were obtained.

The disclosure of the present application relates to subject matter described in Japanese Patent Application No. 2004-084576 filed on Mar. 23, 2004, the contents of the disclosures therein being incorporated herein by reference.

It should be noted that, in addition to those described above, the above-mentioned embodiments can be modified and changed in various ways without departing from the novel and advantageous features of the present invention. Therefore, all such modifications and changes are intended to be included in the appended claims.

What is claimed is:

1. A stencil printing method carried out by employing a stencil printing machine comprising:
   a drum which is rotatable and has an outer peripheral wall formed by an ink impermeable member and in which a stencil sheet is mounted on a surface of the outer peripheral wall;
   an ink supply device which has an ink supply unit provided on the outer peripheral wall of the drum and supplies ink on the surface of the outer peripheral wall from the ink supply unit; and
   a pressure roller which presses a fed print medium onto the outer peripheral wall; the method comprising:
   a step of mounting a stencil sheet on the drum; a step of plate-making the stencil sheet; and
   a step of transferring a water-based ink to a print medium by making the water-based ink pass through perforations of the stencil sheet.

2. The stencil printing method according to claim 1, wherein the water-based ink has an ink viscosity at a shear stress of 10 Pa when the shear stress is increased from 0 Pa at a speed of 1 Pa/s of 500 mPa·s or less at 23° C.

3. The stencil printing method according to claim 1, wherein the water-based ink has an ink thread-forming length when a 15 mm diameter chrome steel ball is pulled out of the ink at 150 mm/s of 30 mm or longer at 23° C.

4. The stencil printing method according to claim 1, wherein the water-based ink comprises an unsaturated straight-chain carboxylic acid-based water-soluble polymer.

* * * * *